(12) United States Patent
Shin et al.

(10) Patent No.: US 8,958,848 B2
(45) Date of Patent: Feb. 17, 2015

(54) MOBILE TERMINAL AND MENU CONTROL METHOD THEREOF

(75) Inventors: Jong-Ho Shin, Seoul (KR); Jong-Keun Youn, Gyeonggi-Do (KR); Dae-Sung Jung, Seoul (KR); Jae-Hoon Yu, Gyeonggi-Do (KR); Tae-Jun Kim, Seoul (KR); Jae-Min Joh, Gyeonggi-Do (KR); Jae-Do Kwak, Seoul (KR)

(73) Assignee: LG Electronics Inc., Seoul (KR)

( * ) Notice: Subject to any disclaimer, the term of this patent is extended or adjusted under 35 U.S.C. 154(b) by 1231 days.

(21) Appl. No.: 12/140,111

(22) Filed: Jun. 16, 2008

(65) Prior Publication Data

US 2009/0253463 A1 Oct. 8, 2009

(30) Foreign Application Priority Data

Apr. 8, 2008 (KR) .................. 10-2008-0032841
Apr. 8, 2008 (KR) .................. 10-2008-0032843
Apr. 10, 2008 (KR) .................. 10-2008-0033350

(51) Int. Cl.
*H04B 1/38* (2006.01)
*G10L 15/00* (2013.01)
*G10L 25/00* (2013.01)
*H04M 1/725* (2006.01)

(52) U.S. Cl.
CPC .................. *H04M 1/72583* (2013.01)
USPC ............ 455/563; 455/564; 704/246; 704/275

(58) Field of Classification Search
CPC .................................................. H04M 1/72583
USPC ................ 455/418, 563, 414, 186.1, 564; 704/246, 251, 275, 257, 9
See application file for complete search history.

(56) References Cited

U.S. PATENT DOCUMENTS 5,664,061 A 9/1997 Andreshak et al.
6,263,216 B1 * 7/2001 Seydoux et al. .............. 455/564

(Continued)

FOREIGN PATENT DOCUMENTS

| CN | 1346566 A | 4/2002 |
| CN | 2865153 | 1/2007 |

(Continued)

OTHER PUBLICATIONS

Chang et al., "A System for Spoken Query Information Retrieval on Mobile Devices," IEEE Transactions on Speech and Audio Processing, vol. 10, No. 8, Nov. 2002, XP011079677, pp. 531-541.

(Continued)

*Primary Examiner* — Kent Chang
*Assistant Examiner* — Kuo Woo
(74) *Attorney, Agent, or Firm* — Birch, Stewart, Kolasch & Birch, LLP

(57) ABSTRACT

A mobile terminal including an input unit configured to receive an input to activate a voice recognition function on the mobile terminal and a memory configured to store multiple domains related to menus and operations of the mobile terminal. It further includes a controller configured to access a specific domain among the multiple domains included in the memory based on the received input to activate the voice recognition function, to recognize user speech based on a language model and an acoustic model of the accessed domain, and to determine at least one menu and operation of the mobile terminal based on the accessed specific domain and the recognized user speech.

20 Claims, 22 Drawing Sheets

(56) References Cited

U.S. PATENT DOCUMENTS

| | | | |
|---|---|---|---|
| 6,567,778 B1 * | 5/2003 | Chao Chang et al. | 704/257 |
| 6,839,670 B1 | 1/2005 | Stammler et al. | |
| 7,383,172 B1 * | 6/2008 | Jamieson | 704/9 |
| 7,519,359 B2 * | 4/2009 | Chiarulli et al. | 455/418 |
| 7,627,313 B2 | 12/2009 | Aretz et al. | |
| 7,865,362 B2 * | 1/2011 | Braho et al. | 704/251 |
| 2001/0011028 A1 | 8/2001 | Wendelrup | |
| 2002/0072917 A1 | 6/2002 | Irvin et al. | |
| 2002/0077830 A1 * | 6/2002 | Suomela et al. | 704/275 |
| 2002/0169608 A1 * | 11/2002 | Tamir et al. | 704/246 |
| 2005/0125235 A1 | 6/2005 | Lazay et al. | |
| 2006/0178882 A1 | 8/2006 | Braho et al. | |
| 2008/0049905 A1 | 2/2008 | Seo | |
| 2008/0235021 A1 * | 9/2008 | Cross et al. | 704/257 |

FOREIGN PATENT DOCUMENTS

| | | |
|---|---|---|
| EP | 0 961 236 A2 | 12/1999 |
| EP | 0 961 263 A2 | 12/1999 |
| KR | 10-2001-0000595 A | 1/2001 |
| KR | 10-2007-0106488 A | 11/2007 |
| RU | 2005-141457 A | 8/2006 |
| WO | WO-2005/050958 A3 | 6/2005 |
| WO | WO-2007/118029 A2 | 10/2007 |

OTHER PUBLICATIONS

Ishikawa et al., "Parallel LVCSR Algorithm for Cellphone-Oriented Multicore Processors," Acoustics, Speech and Signal Processing, IEEE Conference, France, May 2006, pp. I-177 thru I-180, XP031330850.

Lencevicius et al., "Semantic integration and language access to mobile data," Internet citation, Sep. 2007, pp. 1-4, XP007915357, URL:http://www.medien.ifi.lmu.de/mirw2007/(retrieved on Oct. 14, 2010).

* cited by examiner

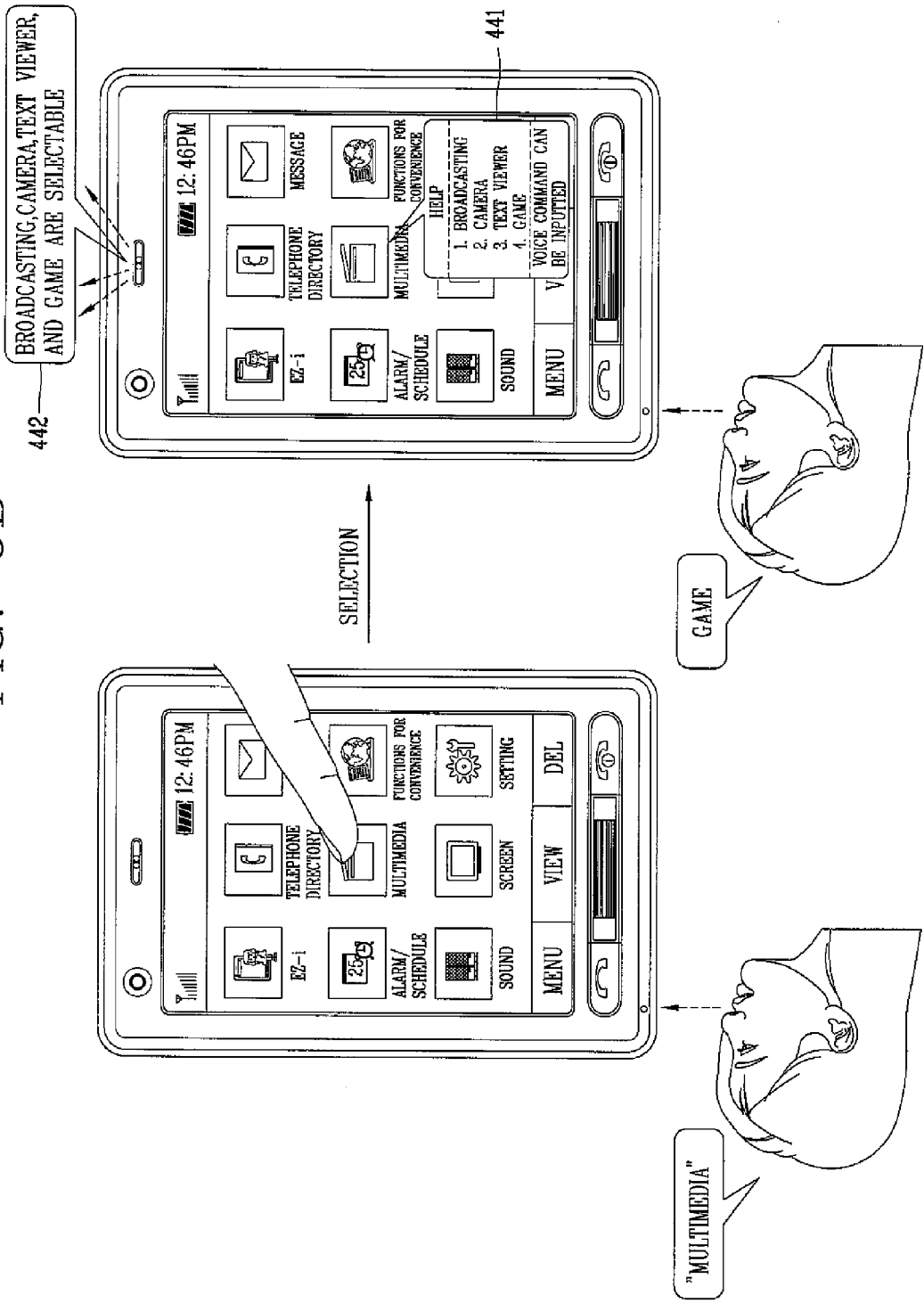

MOBILE TERMINAL AND MENU CONTROL METHOD THEREOF

CROSS REFERENCE TO RELATED APPLICATIONS

The present application claims priority to Korean Applications No. 10-2008-0032841 and No. 10-2008-0032843, both filed in Korea on Apr. 8, 2008, and Korean Application No. 10-2008-0033350 filed in Korea on Apr. 10, 2008, the entire contents of which are hereby incorporated by reference in their entirety.

BACKGROUND OF THE INVENTION

1. Field of the Invention

The present invention relates to a mobile terminal and corresponding method capable of improving a voice recognition rate by setting a domain for voice recognition into information relating to specific menus or services.

2. Description of the Background Art

Mobile terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos etc.

In addition, because the functions included with mobile terminals have significantly increased, the user interfaces have also become more sophisticated. For example, user interfaces now include touch screens allowing the user to touch and select a particular item or menu option. The mobile terminals also include very limited voice recognition functions that allow a user to perform rudimentary functions. However, the error rate in determining the meaning the user's voice instruction is too high, and thus users generally do not use the limited voice recognition features on the terminal.

SUMMARY OF THE INVENTION

Accordingly, one object of the present invention is to address the above-noted and other problems.

Another object of the present invention to provide a mobile terminal and corresponding method for controlling menus relating to specific functions or services thereof by recognizing a meaning of a voice command based on a context and content.

Yet another object of the present invention to provide a mobile terminal and corresponding method that significantly improves a voice recognition rate by specifying a domain for voice recognition into a domain relating to specific menus or services.

Still another object of the present invention to provide a mobile terminal and corresponding method that controls menus relating to specific functions or services by applying one or more user's interfaces (UI) thereof while a voice recognition function is activated so as to detect a user's manipulation.

Yet another object of the present invention to provide a mobile terminal and corresponding method for controlling menus relating to specific functions or services even by a beginner user through his or her voice command, by providing help information with respect to input of the voice command according to an operation state or an operation mode thereof.

To achieve these and other advantages and in accordance with the purpose of the present invention, as embodied and broadly described herein, provides in one aspect a mobile terminal, including an input unit configured to receive an input to activate a voice recognition function on the mobile terminal, a memory configured to store multiple domains related to menus and operations of the mobile terminal, and a controller configured to access a specific domain among the multiple domains included in the memory based on the received input to activate the voice recognition function, to recognize user speech based on a language model and an acoustic model of the accessed domain, and to determine at least one menu and operation of the mobile terminal based on the accessed specific domain and the recognized user speech.

In another aspect, the present invention provides a method of controlling a mobile terminal. The method includes receiving an input to activate a voice recognition function on the mobile terminal, accessing a specific domain among stored multiple domains included in a memory of the mobile terminal based on the received input to activate the voice recognition function, recognizing user speech based on a language model and an acoustic model of the accessed domain, and outputting at least one menu and operation of the mobile terminal based on the accessed specific domain and the recognized user speech.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 6B and 6C are overviews showing a method for outputting help information of a mobile terminal according to an embodiment of the present invention;

DETAILED DESCRIPTION OF THE INVENTION

Reference will now be made in detail to the preferred embodiments of the present invention, examples of which are illustrated in the accompanying drawings.

Figure 1:
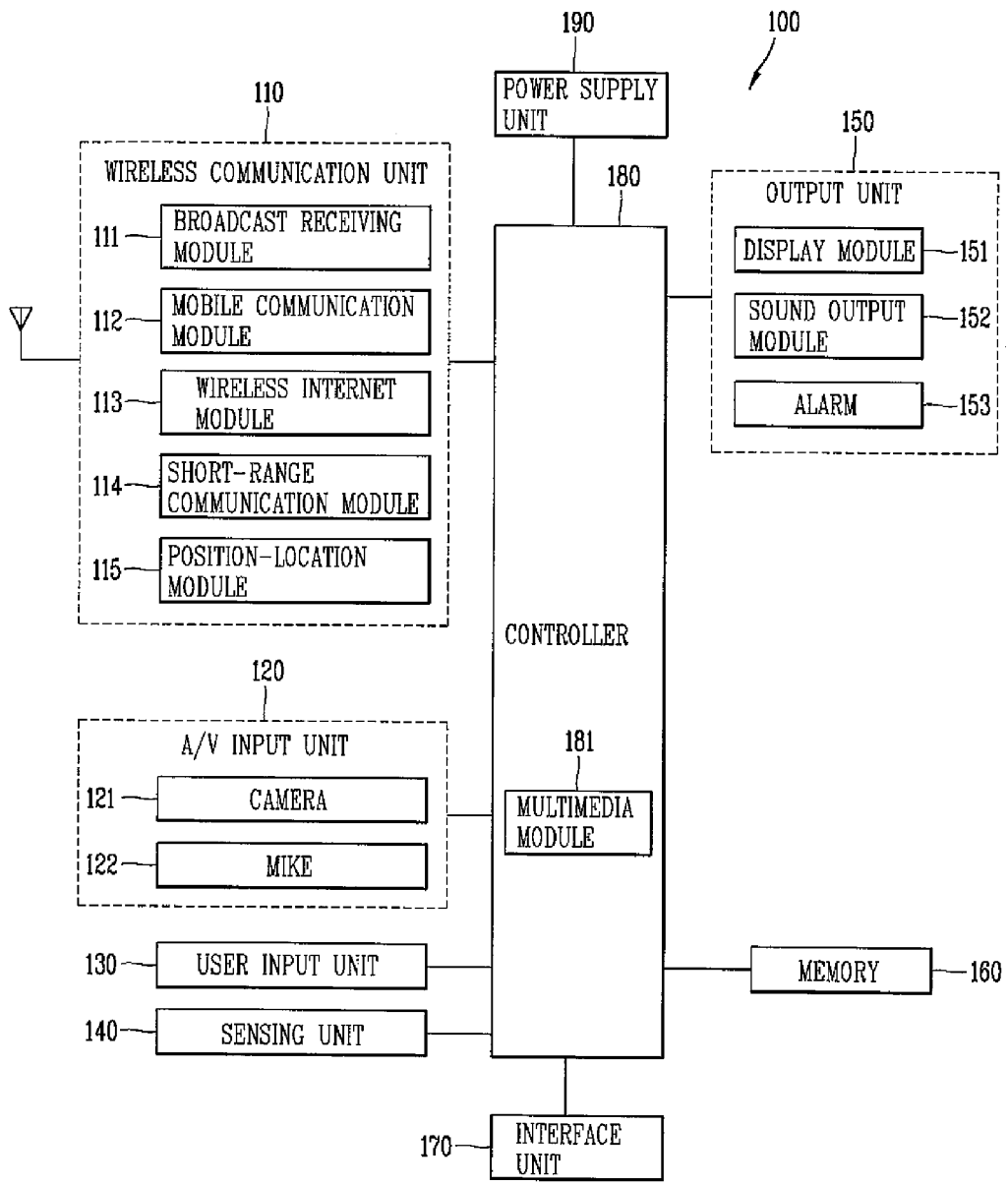
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a wireless communication unit 110 having one or more components which permits wireless communication between the mobile terminal 100 and a wireless communication system or network within which the mobile terminal is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others.

Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof.

In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 generally includes various components which support the output requirements of the mobile terminal 100. The mobile terminal 100 also includes a display 151 that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152 which supports the audio output requirements of the mobile terminal 100. The audio output module 152 may be implemented using one or more speakers, buzzers, other audio producing devices, and combinations thereof. Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is used to signal or otherwise identify the occurrence of a particular event associated with the mobile terminal 100. Alarm events include a call received, a message received and user input received. An example of such output includes the providing of tactile sensations (e.g., vibration) to a user. For instance, the alarm 153 may be configured to vibrate responsive to the mobile terminal 100 receiving a call or message.

As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is used to store various types of data to support the processing, control, and storage requirements of the mobile terminal 100. Examples of such data include program instructions for applications operating on the mobile terminal 100, call history, contact data, phonebook data, messages, pictures, video, etc.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that typically controls the overall operations of the mobile terminal 100. For instance, the controller 180 performs the control and processing associated with voice calls, data communications, instant message communications, video calls, camera operations and recording operations. As shown in FIG. 1, the controller 180 may also include a multimedia module 181 for providing multimedia playback functions. The multimedia module 181 may be configured as part of the controller 180, or may be implemented as a separate component.

In addition, a power supply 190 provides power used by the various components for the portable device. The provided power may be internal power, external power, or combinations thereof.

Figure 2:
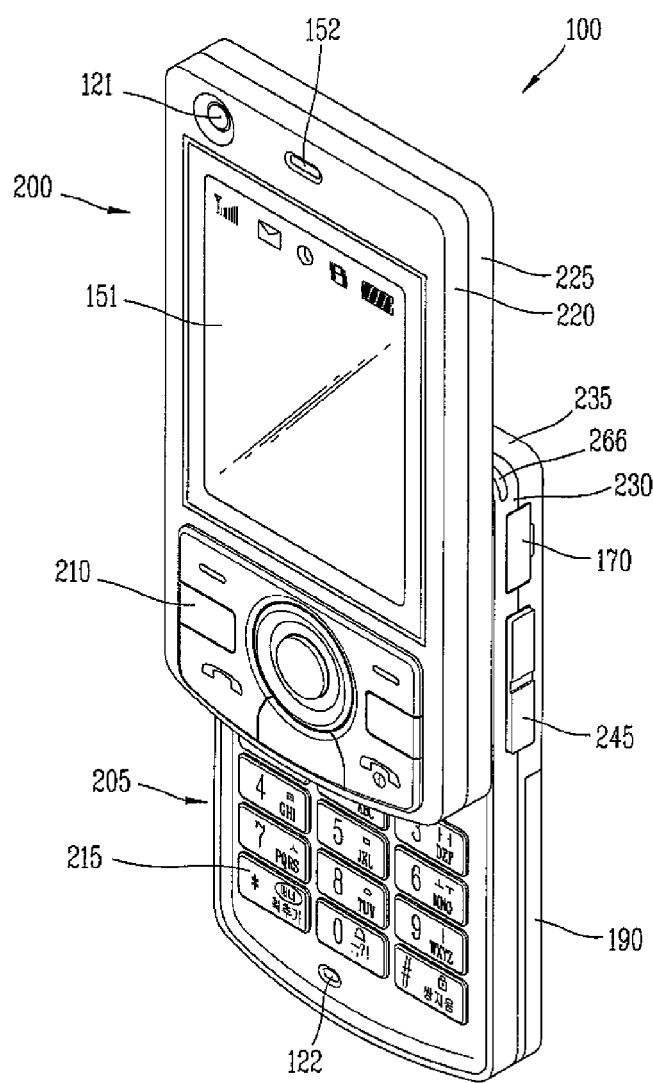
FIG. 2 is a front perspective view of a mobile terminal according to an embodiment of the present invention.

Next, FIG. 2 is a front side view of the mobile terminal 100 according to an embodiment of the present invention. As shown in FIG. 2, the mobile terminal 100 includes a first body 200 configured to slidably cooperate with a second body 205. The user input unit 130 described in FIG. 1 may include a first input unit such as function keys 210, a second input unit such as a keypad 215, and a third input unit such as side keys 245.

The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are preferably formed from a suitably ridge material such as injection molded plastic, or formed using metallic material such as stainless steel (STS) and titanium (Ti).

If desired, one or more intermediate cases may be provided between the first and second cases of one or both of the first and second bodies 200 and 205. In addition, the first and second bodies 200 and 205 are sized to receive electronic components used to support the operation of the mobile terminal 100.

Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200.

Further, the function keys 210 are positioned adjacent to a lower side of the display 151. As discussed above, the display 151 can be implemented as an LCD or OLED. The display 151 may also be configured as a touch screen having an underlying touchpad which generates signals responsive to user contact (e.g., finger, stylus, etc.) with the touch screen.

Also, the second body 205 includes the microphone 122 positioned adjacent to the keypad 215, and side keys 245, which are one type of a user input unit, positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205.

Figure 3:
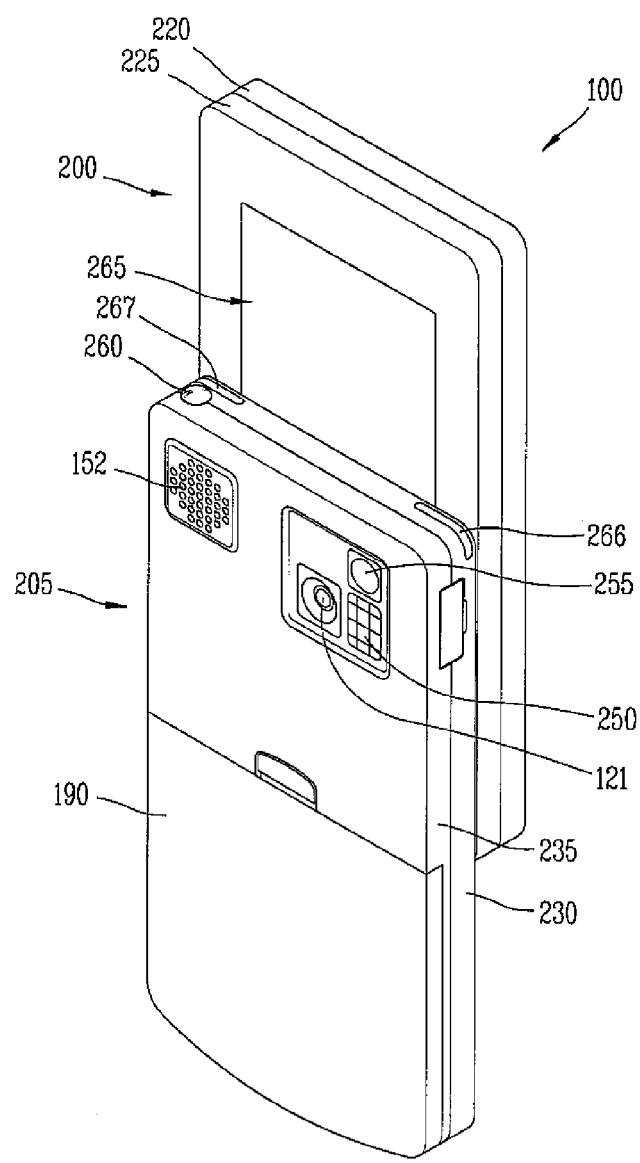
FIG. 3 is a rear perspective view of the mobile terminal shown in FIG. 2.

FIG. 3 is a rear side view of the mobile terminal 100 shown in FIG. 2. As shown in FIG. 3, the second body 205 includes the camera 121, and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited. Further, the relatively higher resolution of the camera 121 of the second body 205 (FIG. 3) is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 1). If desired, the antenna 260 may be fixed or configured to retract into the second body 205. Further, the rear side of the first body 200 includes a slide module 265, which slidably couples with a corresponding slide module located on the front side of the second body 205.

In addition, the illustrated arrangement of the various components of the first and second bodies 200 and 205 may be modified as required or desired. In general, some or all of the components of one body may alternatively be implemented on the other body. Further, the location and relative positioning of such components may be positioned at locations which differ from those shown by the representative figures.

In addition, the mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
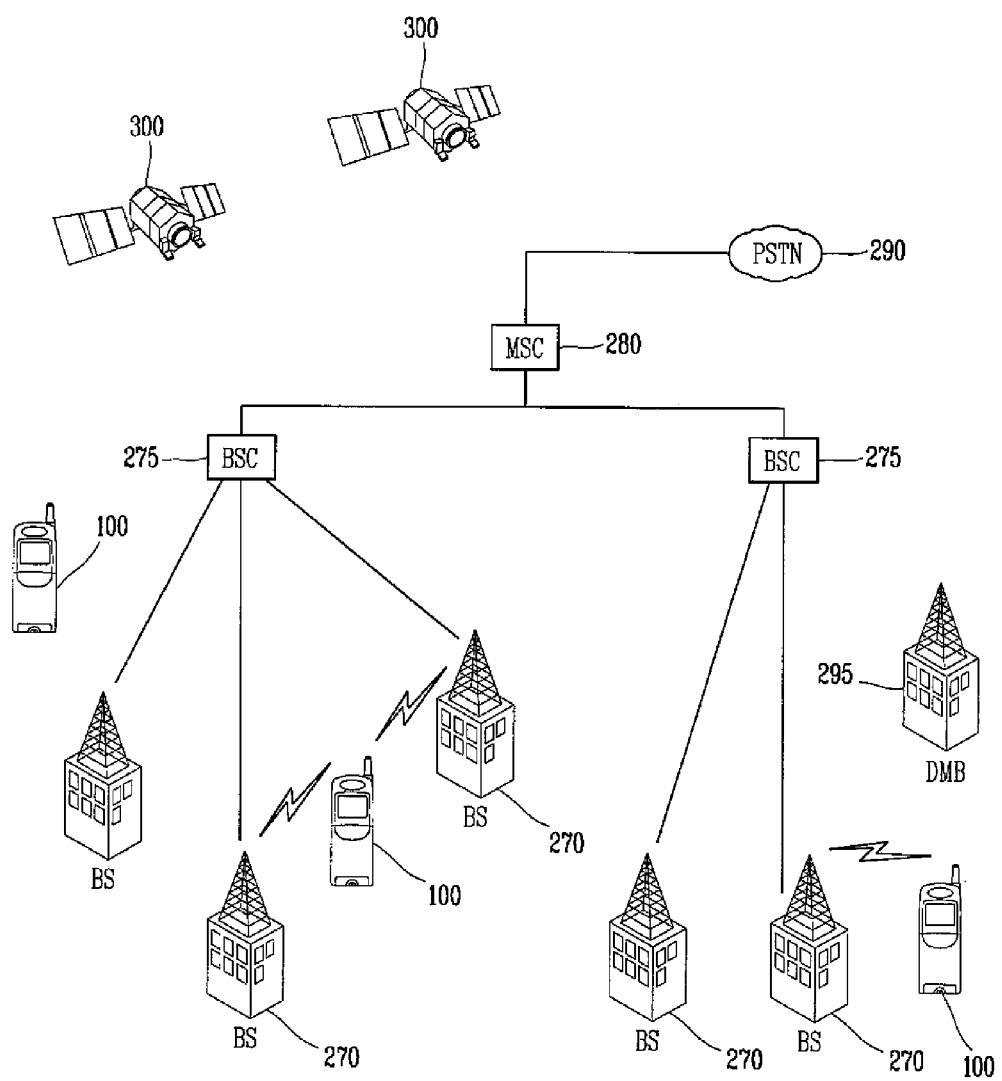
FIG. 4 is an overview of a communication system operable with the mobile terminal of the present invention.

Next, FIG. 4 illustrates a CDMA wireless communication system having a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100. The mobile terminals 100 engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

In the following description, a control method applicable to the above-configured mobile terminal 100 is explained with respect to various embodiments. However, the following embodiments can be implemented independently or through combinations thereof. In addition, in the following description, it is assumed that the display 151 includes a touch screen. Further, the touch screen or its screen will be indicated by the reference number '400'.

In an embodiment of the present invention, the mobile terminal specifies a domain (or information search range) of databases used as a reference for voice command recognition into a domain relating to specific menus or services. Accordingly, the recognition rate for a voice command is improved, and the overall amount of resources used by the mobile terminal is decreased.

Further, the domain of a database used as a reference for voice command recognition can be specified through an environment setting menu of the mobile terminal. Also, once a voice recognition function is activated, the specified domain may be automatically applied.

Hereinafter, the preset domain of a database for voice command recognition is assumed to include information relating to menus currently displayed on the display 151, or information relating to sub-menus of one of the menus.

Figure 5:
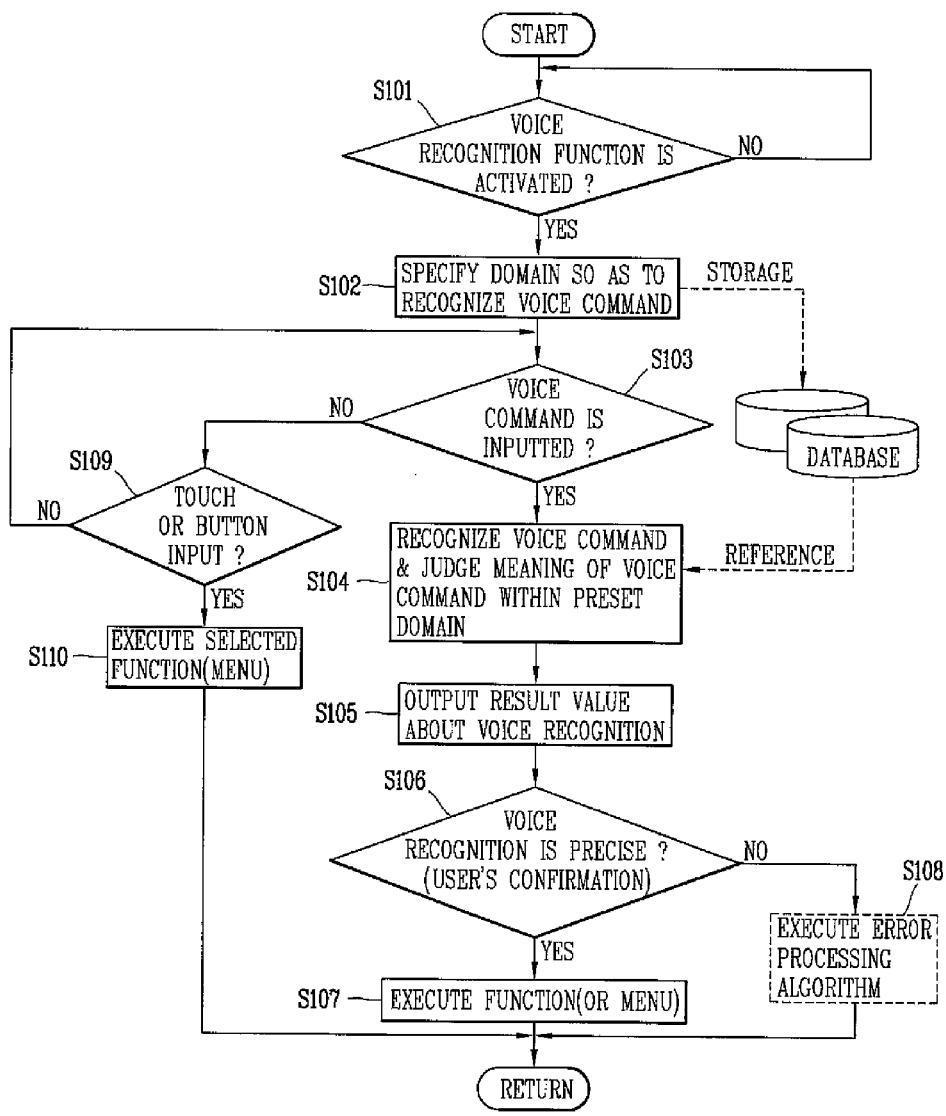
FIG. 5 is a flowchart illustrating a menu control method for a mobile terminal through a voice command according to an embodiment of the present invention.

Next, FIG. 5 is a flowchart showing a menu control method for a mobile terminal through a voice command according to an embodiment of the present invention. FIG. 1 will also be referred to in the following descriptions. As shown in FIG. 5, the controller 180 determines if the voice recognition function has been activated (S101).

Further, the voice recognition function may be activated by the user selecting hardware buttons on the mobile terminal, or soft touch buttons displayed on the display module 151. The user may also activate the voice recognition function by manipulating specific menus displayed on the display 151. The voice recognition function may also be activated by the user generating a specific sound or sound effects, by short or long-range wireless signals, or by the user's body information such as hand gesture or body gesture.

In more detail, the specific sound or sound effects may include impact sounds having a level more than a specific level. Further, the specific sound or sound effects may be detected using a sound level detecting algorithm. In addition, the sound level detecting algorithm is preferably more simple than a voice recognition algorithm, and thus consumes less resources of the mobile terminal. Also, the sound level detecting algorithm (or circuit) may be individually implemented from the voice recognition algorithm or circuit, or may be implemented so as to specifying some functions of the voice recognition algorithm.

In addition, the wireless signals may be received through the wireless communication unit 110, and the user's hand or body gestures may be received through the sensing unit 140. Thus, in an embodiment of the present invention, the wireless communication unit 110, the user input unit 130, and the sensing unit 140 may be referred to as a signal input unit. Further, the voice recognition function may also be terminated in a similar manner.

Having the user physically activate the voice recognition function is particularly advantageous, because the user is more aware they are about to use voice commands to control the terminal. That is, because the user has to first perform a physical manipulation of the terminal, he or she intuitively recognizes they are going to input a voice command or instruction into the terminal, and therefore speak more clearly or slowly to thereby activate a particular function. Thus, because the user speaks more clearly or more slowly, for example, the probability of accurately recognizing the voice instruction increases. That is, in an embodiment of the present invention, the activation of the voice recognition function is performed by a physical manipulation of a button on the terminal rather than activating the voice recognition function by speaking into the terminal.

Further, the controller 180 may start or terminate activation of the voice recognition function based on how many times the user touches a particular button or portion of the touch screen, how long the user touches a particular button or portion of the touch screen, etc. The user can also set how the controller 180 is to activate the voice recognition function using an appropriate menu option provided by the present invention. For example, the user can select a menu option on the terminal that includes 1) set activation of voice recognition based on X number of times the voice activation button is selected, 2) set activation of voice recognition based on X amount of time the voice activation button is selected, 3) set activation of voice recognition when the buttons X and Y are selected, etc. The user can then enter the values of X and Y in order to variably set how the controller 180 determines the voice activation function is activated. Thus, according to an embodiment of the present invention, the user is actively engaged with the voice activation function of their own mobile terminal, which increases the probability that the controller 180 will determine the correct function corresponding to the user's voice instruction, and which allows the user to tailor the voice activation function according to his or her needs.

The controller 180 may also maintain the activated state of the voice recognition function while the designated button(s) are touched or selected, and stop the voice recognition function when the designated button(s) are released. Alternatively, the controller 180 can maintain the activation of the voice recognition function for a predetermined time period after the designated button(s) are touched or selected, and stop or terminate the voice recognition function when the predetermined time period ends. In yet another embodiment, the controller 180 can store received voice instructions in the memory 160 while the voice recognition function is maintained in the activated state.

In addition, as shown in FIG. 5, a domain of the database used as a reference for recognizing the meaning of the voice command is specified to information relating to specific functions or menus on the terminal (S102). For instance, the specified domain of database may be information relating to menus currently displayed on the display 151, or information relating to sub-menus of one of the displayed menus. Further, because the domain of database is specified, the recognition rate for the input voice command is improved. Examples of domains include an e-mail domain, a received calls domain, and multimedia domain, etc.

Also, the information relating to sub-menus may be configured as data in a database. For example, the information may be configured in the form of a keyword, and a plurality of information may correspond to one function or menu. In addition, the database can be a plurality of databases according to features of information, and may be stored in the memory 160.

Further, the information in the database(s) may be advantageously updated or renewed through a learning process. Each domain of the respective databases may also be specified into a domain relating to functions or menus being currently output, so as to enhance a recognition rate for a voice command. The domain may also change as menu steps continue to progress.

Once the voice recognition function is activated (Yes in S101) and the domain has been specified (S102), the controller 180 determines if the user has input a voice command (S103). When the controller 180 determines the user has input the voice command (Yes in S103), the controller 180 analyzes a context and content of a voice command or instruction input through the microphone 122 based on a specific database, thereby judging a meaning of the voice command (S104).

Further, the controller 180 can determine the meaning of the voice instruction or command based on a language model and an acoustic model of the accessed domain. In more detail, the language model relates to the words themselves and the acoustic model corresponds to the way the words are spoken (e.g., frequency components of the spoken words or phrases). Using the language and acoustic models together with a specific domain and a state of the mobile terminal 100, the controller 180 can effectively determine the meaning of the input voice instructions or command.

Further, the controller 180 may immediately start the process for judging the meaning of the input voice command when the user releases the activation of the voice recognition function when the controller 180 stores the input voice command in the memory 160, or may simultaneously perform the voice activation function when the voice command is input.

In addition, if the voice command has not been fully input (No in S103), the controller 180 can still perform other functions. For example, if the user performs another action by touching a menu option, etc. or presses a button on the terminal (Yes in S109), the controller 180 performs the corresponding selected function (S110).

Further, after the controller 180 determines the meaning of the input voice command in step S104, the controller 180 outputs a result value of the meaning (S105). That is, the result value may include control signals for executing menus relating to functions or services corresponding to the determined meaning, for controlling specific components of the mobile terminal, etc. The result value may also include data for displaying information relating to the recognized voice command.

The controller may also request the user confirm the output result value is accurate (S106). For instance, when the voice command has a low recognition rate or is determined to have a plurality of meanings, the controller 180 can output a plurality of menus relating to the respective meanings, and then execute a menu that is selected by the user (S107). Also, the controller 180 may ask a user whether to execute a specific menu having a high recognition rate, and then execute or display a corresponding function or menu according to the user's selection or response.

In addition, the controller 180 can also output a voice message asking the user to select a particular menu or option such as "Do you want to execute a photo album menu? Reply with Yes or No." Then, the controller 180 executes or does not execute a function corresponding to the particular menu or option based on the user's response. If the user does not respond in a particular time period (e.g., five seconds), the controller 180 can also immediately execute the particular menu or option. That is, if there is no response from the user, the controller 180 may automatically execute the function or menu by judging the non-response as a positive answer.

Further, the user may reply to the question from the controller 180 using his or her voice (e.g., Yes or No) or via other input units such as hardware or software buttons, a touch pad, etc. In addition, in step S106, if there is a negative answer from the user (No in S106), that is, if a meaning of the voice command is not precisely judged, the controller 180 may execute an additional error processing step (S108).

That is, the error processing step may be performed by again receiving input of a voice command, or may be performed by displaying a plurality of menus having a recognition rate more than a certain level or a plurality of menus that may be judged to have similar meanings. The user can then select one of the plurality of menus. Also, when the number of functions or menus having a recognition rate more than a certain level is less than a preset number (e.g., two), the controller 180 can automatically execute the corresponding function or menu.

Figure 6A:
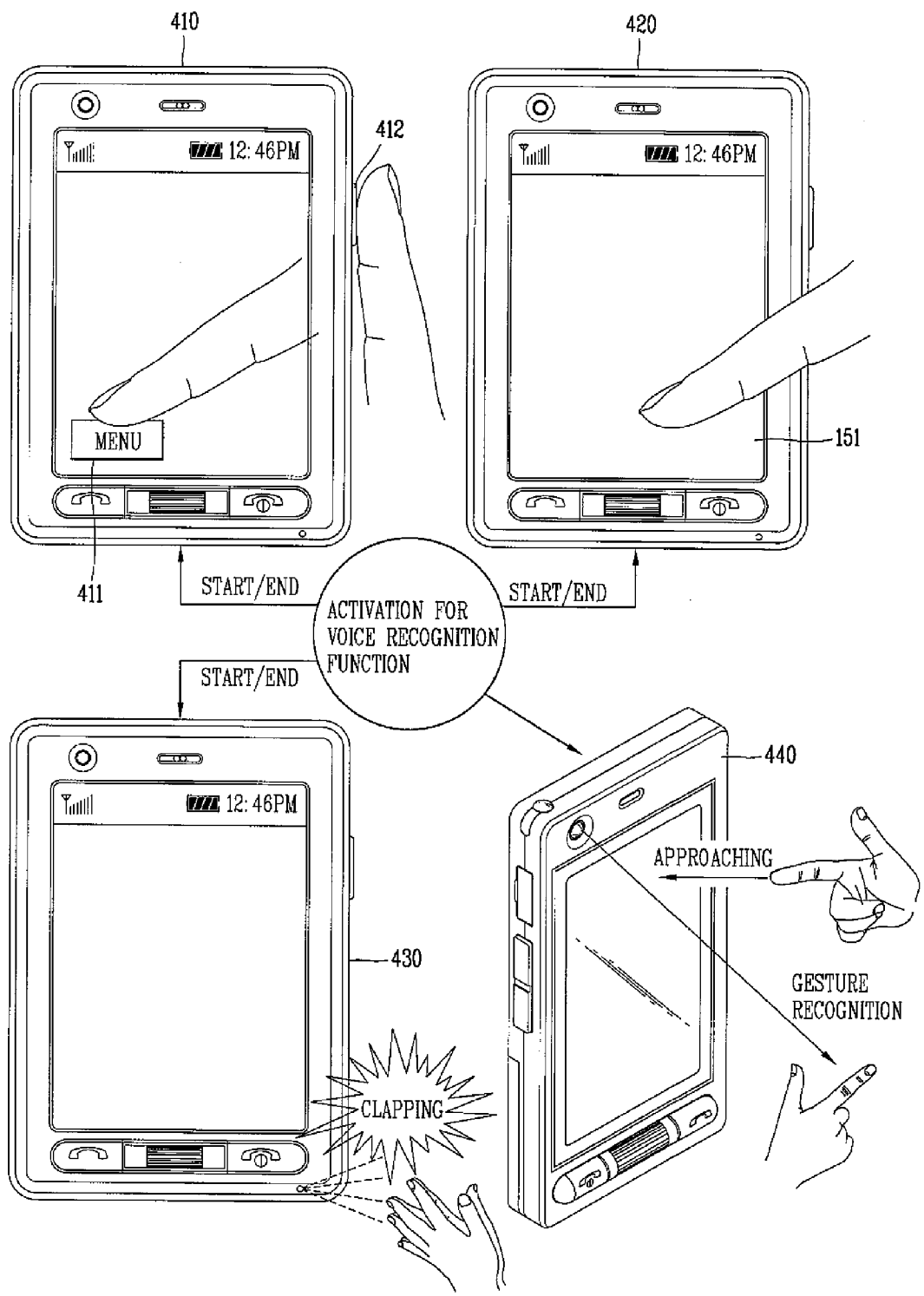
FIG. 6A is an overview showing a method for activating a voice recognition function for a mobile terminal according to an embodiment of the present invention.

Next, FIG. 6A is an overview showing a method for activating a voice recognition function for a mobile terminal according to an embodiment of the present invention. As shown in the display screen 410, the user can activate the voice recognition function by touching a soft button 411. The user can also terminate the voice recognition function by releasing the soft button 411. In more detail, the user can activate the voice recognition function by touching the soft button 411 and continuously touch the soft button 411, or hard button 412, until the voice instruction has been completed. That is, the user can release the soft button 411 or hard button 412 when the voice instruction has been completed. Thus, the controller 180 is made aware of when the voice instruction is to be input and when the voice instruction has been completed. As discussed above, because the user is directly involved in this determination, the accuracy of the interpretation of the input voice command is increased.

The controller 180 can also be configured to recognize the start of the voice activation feature when the user first touches the soft button 411, and then recognize the voice instruction has been completed when the user touches the soft button 411 twice, for example. Other selection methods are also possible. Further, as shown in the display screen 410 in FIG. 6A, rather than using the soft button 411, the voice activation and de-activation can be performed by manipulating a hard button 412 on the terminal.

In addition, the soft button 411 shown in the display screen 410 can be a single soft button that the user presses or releases to activate/deactivate the voice recognition function or may be a menu button that when selected produces a menu list such as "1. Start voice activation, and 2. Stop voice activation"). The soft button 411 can also be displayed during a standby state, for example.

In another example, and as shown in the display screen 420, the user can also activate and deactivate the voice recognition function by touching an arbitrary position of the screen. The display screen 430 illustrates yet another example in which the user activates and deactivates the voice recognition function by producing a specific sound or sound effects that is/are greater than a specific level. For example, the user may clap their hands together to produce such an impact sound.

Thus, according to an embodiment of the present invention, the voice recognition function may be implemented in two modes. For example, the voice recognition function may be implemented in a first mode for detecting a particular sound or sound effects more than a certain level, and in a second mode for recognizing a voice command and determining a meaning of the voice command. If the sound or sound effects is/are more than a certain level in the first mode, the second mode is activated to thereby to recognize the voice command.

The display screen 440 illustrates still another method of the user activating and deactivating the voice recognition function. In this example, the controller 180 is configured to interpret body movements of the user to start and stop the voice activation function. For example, and as shown in the display screen 440, the controller 180 may be configured to interpret the user moving his hand toward the display as an instruction to activate the voice recognition function, and the user moving his hand away from the display as an instruction to terminate the voice activation function. Short or long-range wireless signals may also be used to start and stop the voice recognition function.

Thus, according to an embodiment of the present invention, because the voice activation function is started and stopped, the voice recognition function is not continuously executed. That is, when the voice recognition function is continuously maintained in the activated state, the amount of resources on the mobile terminal is increased compared to the embodiment of the present invention.

Further, as discussed above with respect to FIG. 5, when the voice recognition function is activated, the controller 180 specifies a domain of a specific database that is used as a reference for voice command recognition into a domain relating to a menu list on the display 151. Then, if a specific menu is selected or executed from the menu list, the domain of the database may be specified into information relating to the selected menu or sub-menus of the specific menu.

Figure 6C:
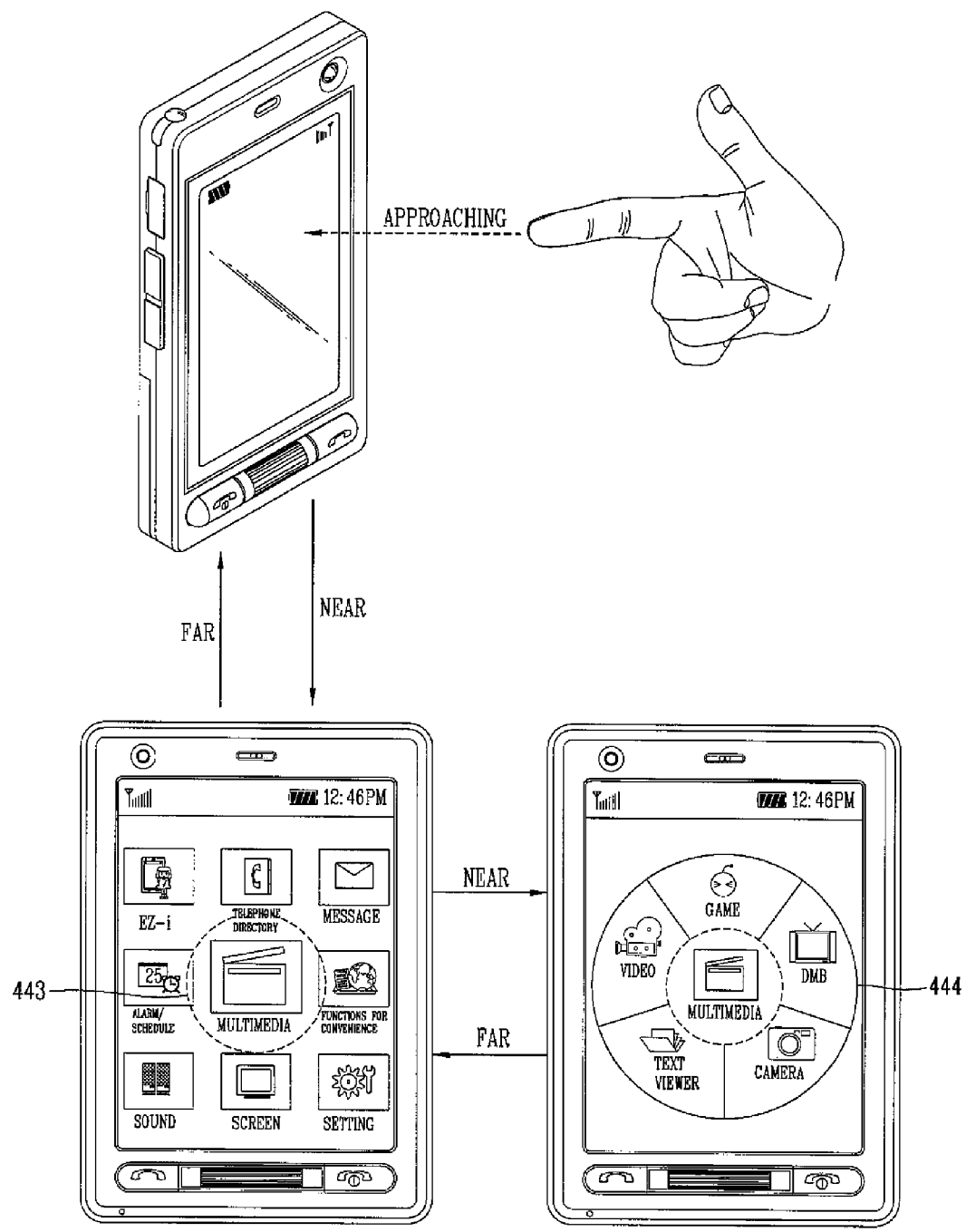

In addition, when the specific menu is selected or executed through a voice command or touch input, the controller 180 may output help information relating to sub-menus of the specific menu in the form of a voice message, or pop-up windows or balloons. For example, as shown in FIG. 6B, when the user selects the 'multimedia menu' via a touching or voice operation, the controller 180 displays information relating to the sub-menus (e.g., broadcasting, camera, text viewer, game, etc.) of the 'multimedia menu' as balloon-shaped help information 441. Alternatively, the controller 180 can output a voice signal 442 including the help information. The user can then select one of the displayed help options using a voice command or by a touching operation FIG. 6C illustrates an embodiment of a user selecting a menu item using his or her body movements (in this example, the user's hand gesture). In more detail, as the user moves his or her finger closer to the menu item 443, the controller 180 displays the sub-menus 444 related to the menu 443. The controller 180 can recognize the user's body movement of information via the sensing unit 140, for example. In addition, the displayed help information can be displayed so as to have a transparency or brightness controlled according to the user's distance That is, as the user's hand gets closer, the displayed items can be further highlighted.

As discussed above, the controller 180 can be configured to determine the starting and stopping of the voice recognition function based on a variety of different methods. For example, the user can select/manipulate soft or hard buttons, touch an arbitrary position on the touch screen, etc. The controller 180 can also maintain the activation of the voice recognition function for a predetermined amount of time, and then automatically end the activation at the end of the predetermined amount of time. Also, the controller 180 may maintain the activation only while a specific button or touch operation is performed, and then automatically end the activation when the input is released. The controller 180 can also end the activation process when the voice command is no longer input for a certain amount of time.

Figure 7A:
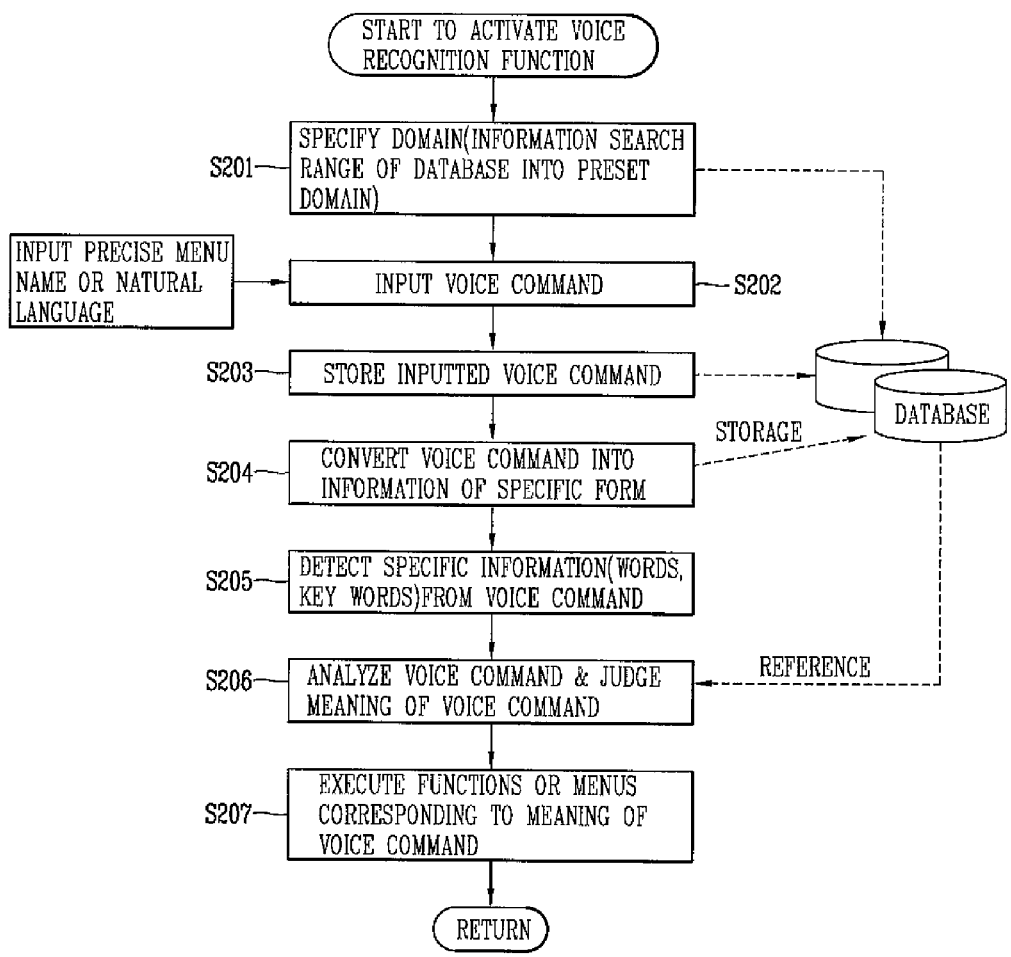
FIG. 7A is a flowchart showing a method for recognizing a voice command of a mobile terminal according to an embodiment of the present invention.

Next, FIG. 7A is a flowchart showing a method for recognizing a voice command in a mobile terminal according to an embodiment of the present invention. Referring to FIG. 7A: when the voice recognition function is activated, the controller 180 specifies a domain of a database that can be used as a reference for voice command recognition into a domain relating to a menu displayed on the display 151 or sub-menus of the menu (S201). The user also inputs the voice command (S202) using either the precise menu name or using a natural language (spoken English, for example).

The controller 180 then stores the input voice command in the memory 160 (S203). Further, when the voice command is input under a specified domain, the controller 180 analyzes a context and content of the voice command based on the specified domain by using a voice recognition algorithm. Also, the voice command may be converted into text-type information for analysis (S204), and then stored in a specific database of the memory 160. However, the step of converting the voice command into text-type information can be omitted.

Then, to analyze the context and content of the voice command, the controller 180 detects a specific word or keyword of the voice command (S205). Based on the detected words or keywords, the controller 180 analyzes the context and content of the voice command and determines or judges a meaning of the voice command by referring to information stored in the specific database (S206).

In addition, as discussed above, the database used as a reference includes a specified domain, and functions or menus corresponding to a meaning of the voice command judged based on the database are executed (S207). Also, because the database for voice recognition is specified to each information relating to specific menus, the recognition rate and speed for of recognizing the voice command are improved, and the amount of resources used on the terminal is reduced. Further, the recognition rate indicates a matching degree with a name preset to a specific menu.

The recognition rate for an input voice command may also be judged by the number of information relating to specific functions or menus of the voice command. Therefore, the recognition rate for the input voice command is improved when the information precisely matches a specific function or menu (e.g., menu name) that is included in the voice command.

Figure 7B:
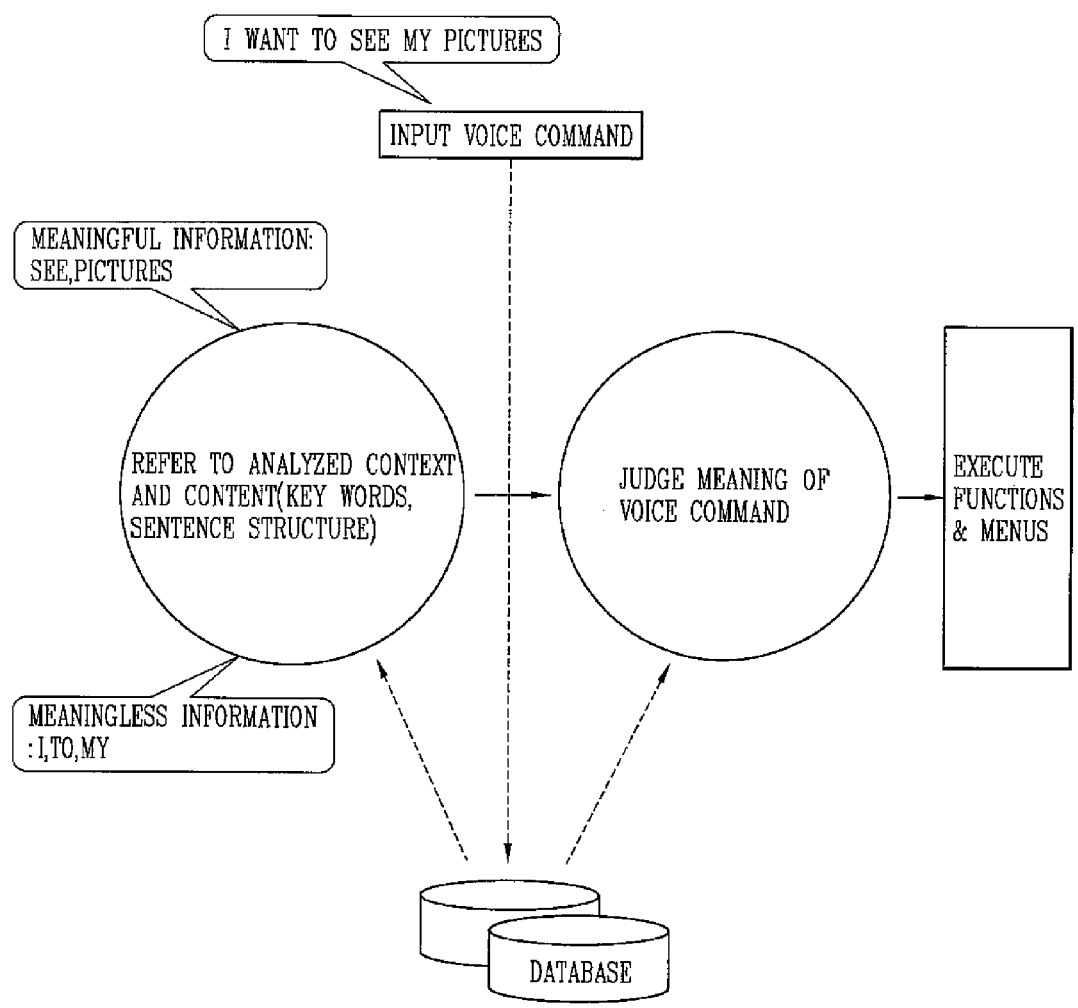
FIG. 7B is an overview showing a method for recognizing a voice command of a mobile terminal according to an embodiment of the present invention.

In more detail, FIG. 7B is an overview showing a method for recognizing a voice command of a mobile terminal according to an embodiment of the present invention. As shown in FIG. 7B, the user inputs a voice command as a natural language composed of six words "I want to see my pictures." In this example, the recognition rate can be judged based on the number of meaningful words (e.g., see, pictures) relating to a specific menu (e.g., photo album). In addition, the controller 180 can determine whether the words included in the voice command are meaningful words relating to a specific function or menu based on the information stored in the database. For instance, meaningless words included in the natural language voice command that are irrelevant to the specific menu may be the subject (I), the preposition (to), and the possessive pronoun (my).

Also, the natural language is a language commonly used by people, and has a concept contrary to that of an artificial language. Further, the natural language may be processed by using a natural language processing algorithm. The natural language may or may not include a precise name relating to a specific menu, which sometimes causes a difficulty in completely precisely recognizing a voice command. Therefore, according to an embodiment of the present invention, when a voice command has a recognition rate more than a certain level (e.g., 80%), the controller 180 judges the recognition to be precise.

Further, when the controller 180 judges a plurality of menus to have similar meanings, the controller 180 displays the plurality of menus and the user can select one of the displayed menus to have its functions executed. In addition, a menu having a relatively higher recognition rate may be displayed first or distinctively displayed compared to the other menus.

Figure 8:
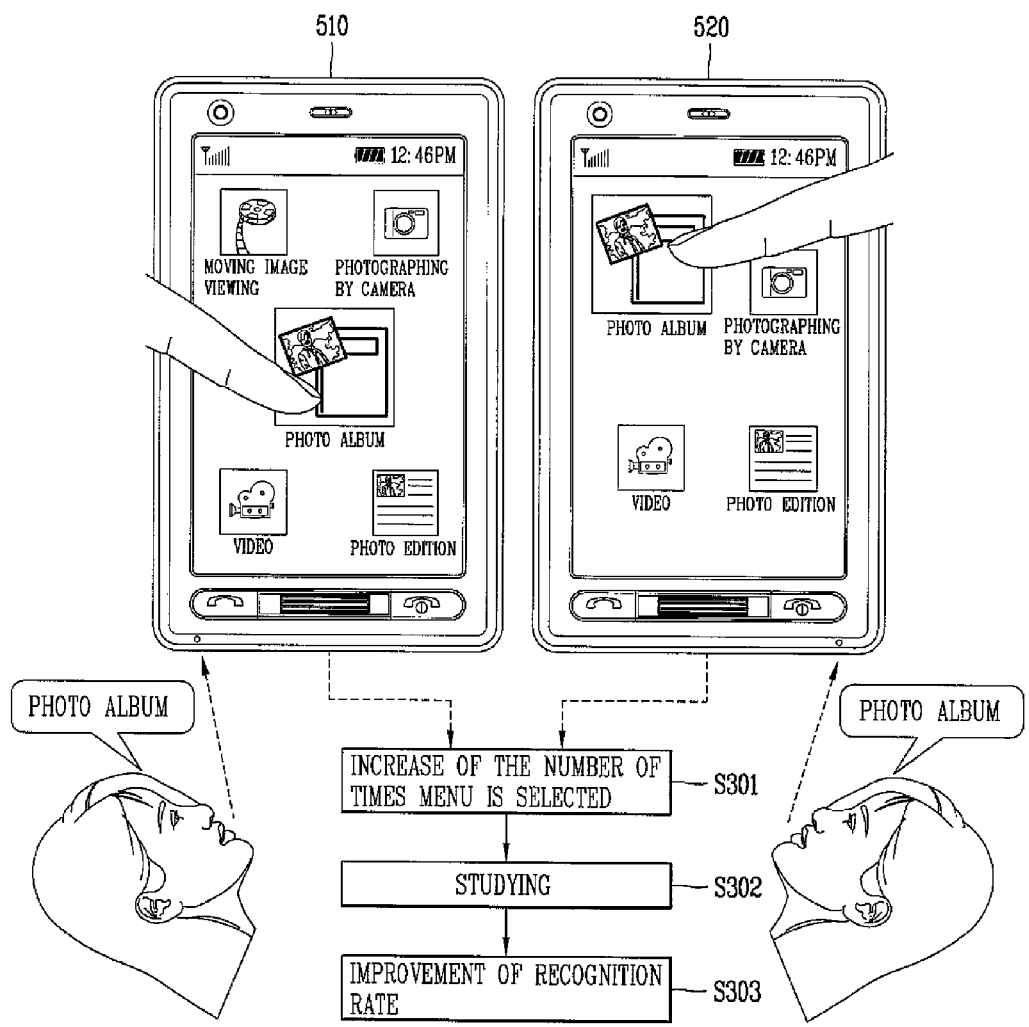
FIG. 8 is an overview showing a method for displaying menus for a voice recognition rate of a mobile terminal according to an embodiment of the present invention.

For example, FIG. 8 is an overview showing a method for displaying menus for a voice recognition rate of a mobile terminal according to an embodiment of the present invention. As shown in FIG. 8, a menu icon having a higher recognition rate is displayed at a central portion of the display screen 510, or may be displayed with a larger size or a darker color as shown in the display screen 520. The menu icon having the higher recognition rate can also be displayed first and then followed in order or sequential manner by lower recognition rate menus.

Further, the controller 180 can distinctively display the plurality of menus by changing at least one of the size, position, color, brightness of the menus or by highlighting in the order of a higher recognition rate. The transparency of the menus may also be appropriately changed or controlled.

In addition, as shown in the lower portion of FIG. 8, a menu having a higher selection rate by a user may be updated or set to have a recognition rate. That is, the controller 180 stores a history of the user selections (S301) and performs a learning process (S302) to thereby update a particular recognition rate for a menu option that is selected by a user more than other menu options (S303). Thus, the number of times a frequently used menu is selected by a user may be applied to recognition rate of the menu. Therefore, a voice command input in the same or similar manner in pronunciation or content may have a different recognition rate according to how many times a user selects a particular menu.

Further, the controller 180 may also store time at which the user performs particular functions. For example, a user may check emails or missed messages every time they wake up on Mondays through Fridays. This time information may also be used to improve the recognition rate. The state of the terminal (e.g., standby mode, etc.) may also be used to improve the recognition rate. For example, the user may check emails or missed messages when first turning on their mobile terminal, when the terminal is opened from a closed position, etc.

Figure 9:
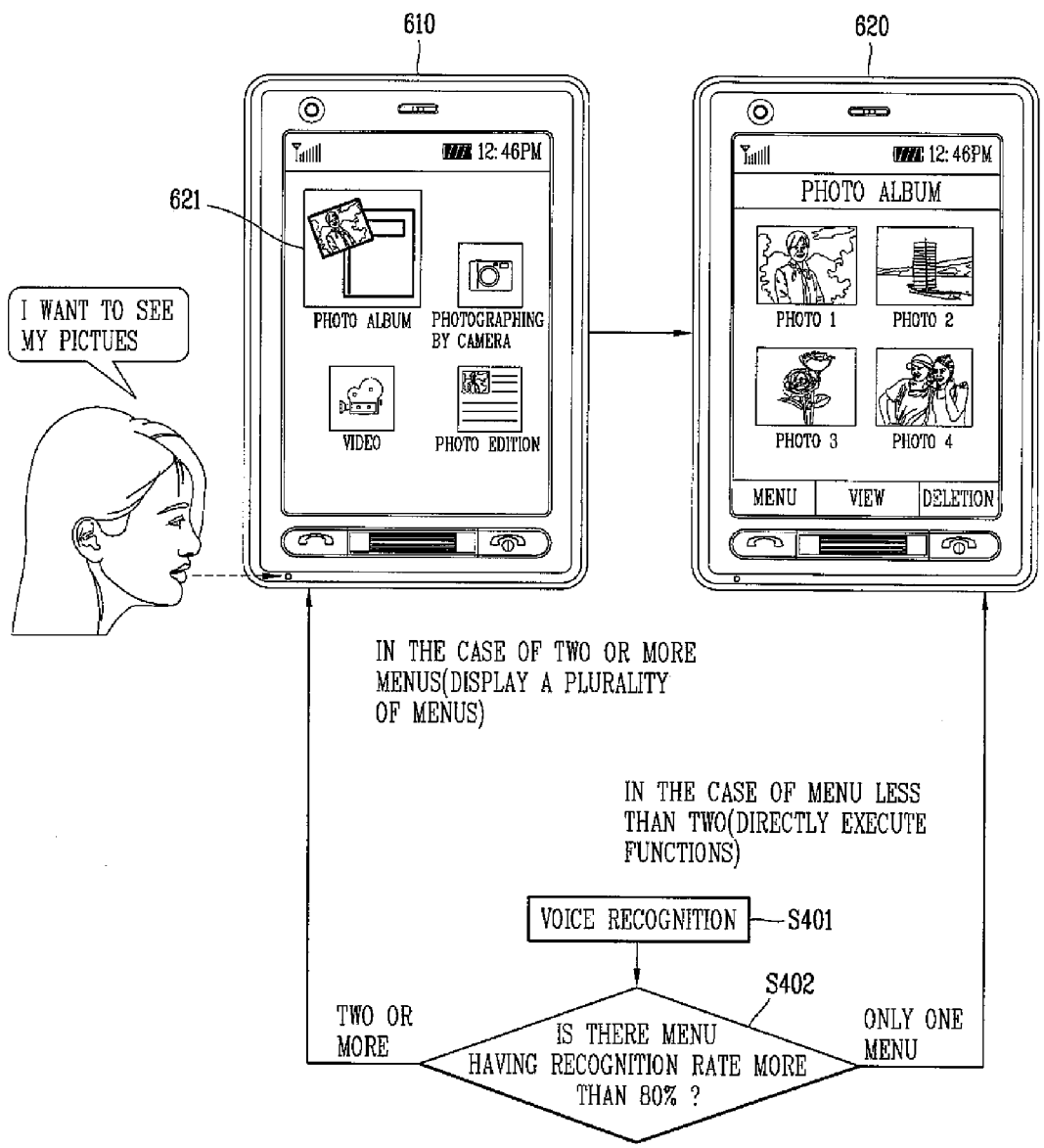
FIG. 9 is an overview showing a method for recognizing a voice command of a mobile terminal according to another embodiment of the present invention.

Next, FIG. 9 is an overview showing a method for recognizing a voice command of a mobile terminal according to another embodiment of the present invention. As shown in FIG. 9, the user activates the voice recognition function, and inputs the voice command "I want to see my pictures." The controller 180 then specifies a domain of a database for voice command recognition into a domain relating to the displayed sub-menus. The controller 180 then interprets the voice command (S401) and in this example, displays a plurality of menus that have a probability greater than a particular value (e.g., 80%) (S402). As shown in the display screen 610 in FIG. 9, the controller displays four multimedia menus.

The controller 180 also distinctively displays a menu having the highest probably (e.g., the "Photo Album" menu option 621 in this example). The user can then select any one of the displayed menus to execute a function corresponding to the selected menu. In the example shown in FIG. 9, the user selects the photo album menu option 621 and the controller 180 displays pictures in the selected Photo Album as shown in the display screen 620.

Also, as shown in step S402 in the lower portion of FIG. 9, the controller 180 can also immediately execute a function when only a single menu is determined to be higher than the predetermined probability rate. That is, the controller 180 displays the pictures in the photo album as shown in the display screen 620 immediately without the user having to select the Photo Album menu option 621 when the Photo Album menu option 621 is determined to be the only menu that has a higher recognition rate or probability than a predetermined threshold. In addition, even though a menu has a precise name such as "photo album", the memory 160 can store a plurality of information relating to the menu such as "photo, picture, album".

Further, as discussed above with respect to FIG. 6B, the controller 180 can also output help information to the user when a specific menu is selected or executed through a voice command or touch input according to an operation state or mode (e.g., a mode for indicating a voice recognition function). In addition, the user can set the operation mode for outputting the help using appropriate menu options provided in environment setting menus. Accordingly, a user can operate the terminal of the present invention without needing or having a high level of skill. That is, many older people may not be experienced in operating the plurality of different menus provided with terminal. However, with the terminal of the present invention, a user who is generally not familiar with the intricacies of the user interfaces provided with the terminal can easily operate the mobile terminal.

In addition, when the controller 180 recognizes the voice command to have a plurality of meanings (i.e., when a natural language voice command does not include a precise menu name such as when a menu is included in a 'multimedia' category but does not have a precise name among 'camera', 'photo album', and 'video'), the controller 180 displays a plurality of menus having a recognition rate more than a certain value (e.g. 80%).

Figure 10:
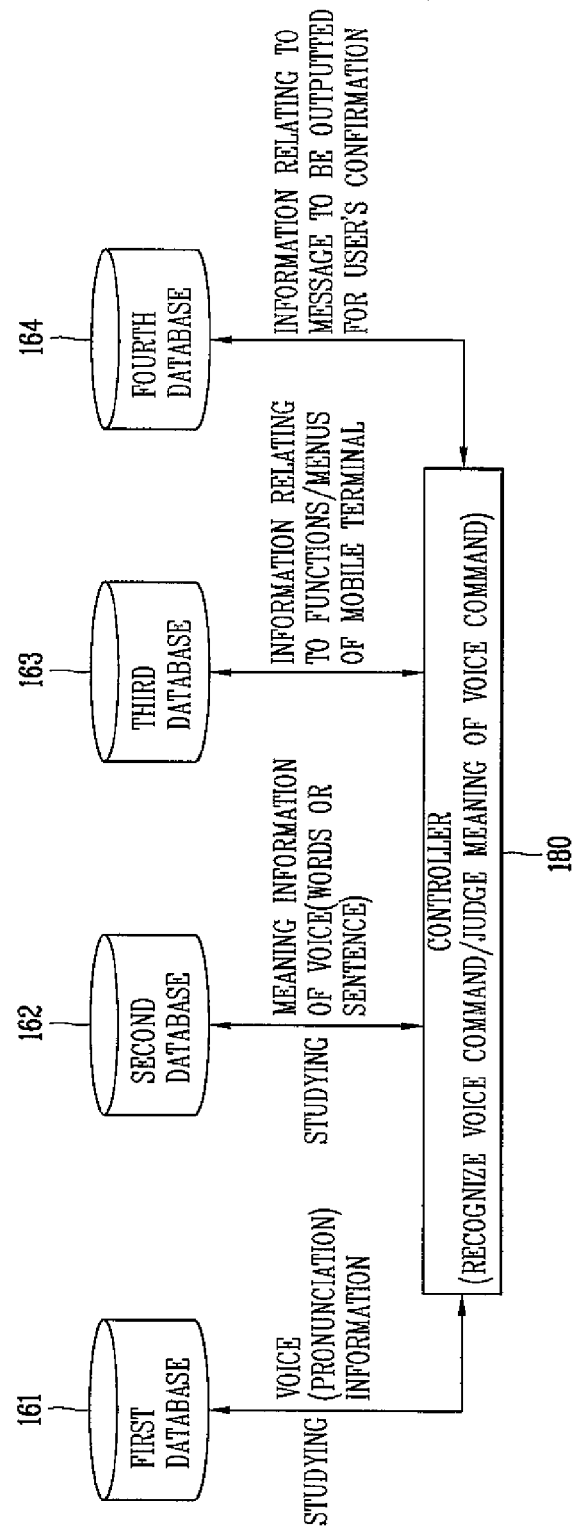
FIG. 10 is an overview of a configuration of databases used as a reference for voice command recognition of a mobile terminal according to an embodiment of the present invention.

Next, FIG. 10 is an overview showing a plurality of databases used by the controller 180 for recognizing a voice command of a mobile terminal according to an embodiment of the present invention. In this embodiment, the databases store information that the controller 180 uses to judge a meaning of a voice command, and may be any number of databases according to information features. Further, the respective databases configured according to information features may be updated through a continuous learning process under control of the controller 180.

For example, the learning process attempts to match a user's voice with a corresponding word. For example, when a Korean word, 'Saeng-il' (indicating 'birthday') pronounced by a user is misunderstood as 'Saeng-hwal' (indicating 'life'), the user corrects the word 'Saeng-hwal' into 'Saeng-il'. Accordingly, the same pronunciation to be subsequently input by the user is made to be recognized as 'Saeng-il'.

As shown in FIG. 10, the respective databases according to information features include a first database 161, a second database 162, a third database 163, and a fourth database 164. In this embodiment, the first database 161 stores voice information for recognizing a voice input through the microphone in units of phonemes or syllables, or morphemes. The second database 162 stores information (e.g., grammar, pronunciation precision, sentence structure, etc.) for judging an entire meaning of a voice command based on the recognized voice information. The third database 163 stores information relating to menus for functions or services of the mobile terminal, and the fourth database 164 stores a message or voice information to be output from the mobile terminal so as to receive a user's confirmation about the judged meaning of the voice command In addition, the third database 163 may be specified into information relating to menus of a specific category according to a domain preset for voice command recognition, Also, the respective database may store sound (pronunciation) information, and phonemes, syllable, morphemes, words, keywords, or sentences corresponding to the pronunciation information. Accordingly, the controller 180 can determine or judge the meaning of a voice command by using at least one of the plurality of databases 161 to 164, and execute menus relating to functions or services corresponding to the judged meaning of the voice command.

Figure 11:
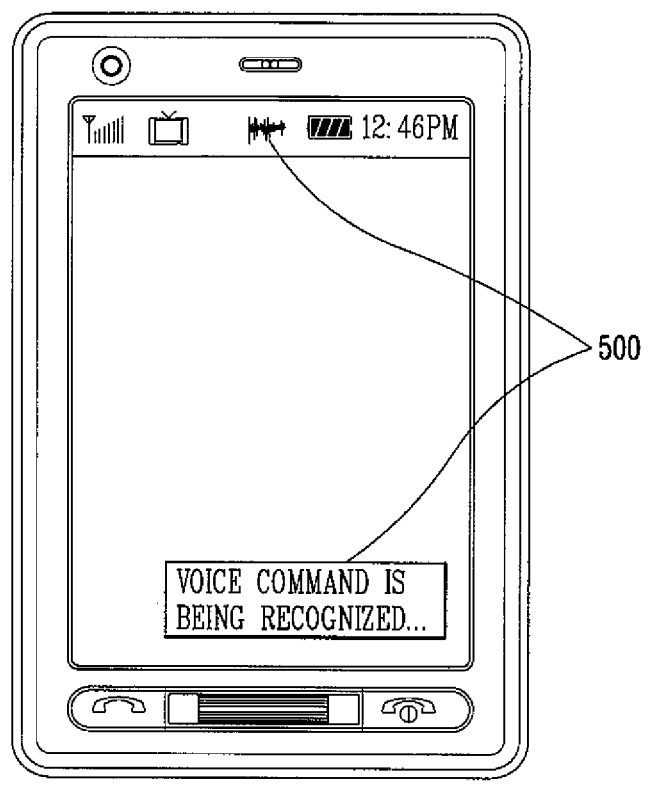
FIG. 11 is an overview showing a state that a voice recognition function of a mobile terminal is being executed according to an embodiment of the present invention.

Next, FIG. 11 is an overview showing a state that a voice recognition function of a mobile terminal is being performed according to an embodiment of the present invention. As shown, when the controller 180 is executing the voice recognition function, the controller 180 displays a specific indicator or an icon 500 that informs the user the voice recognition function is being executed. The controller 180 can also output a sound or message to inform the user that the voice recognition function is being executed.

Further, the above-described embodiments refer to recognizing the user's voice instruction. However, the present invention is also applicable to the user performing an additional input function while the voice instruction is being recognized. For example, a voice recognition and a touch input, a voice recognition and a button input, or a voice recognition or touch/button inputs may be simultaneously performed.

In addition, the controller 180 may prevent the voice recognition function from being performed in a particular mode or menu or in a particular operational state. Further, audio information (e.g., voice announcement or guidance information) or video information (e.g., the indicator 500 in FIG. 11) indicating that a voice recognition function is being applied may be displayed in the voice recognition mode, menu or operational state. Also, information that the voice recognition function is being applied may be provided to the user by outputting help information.

Figure 12:
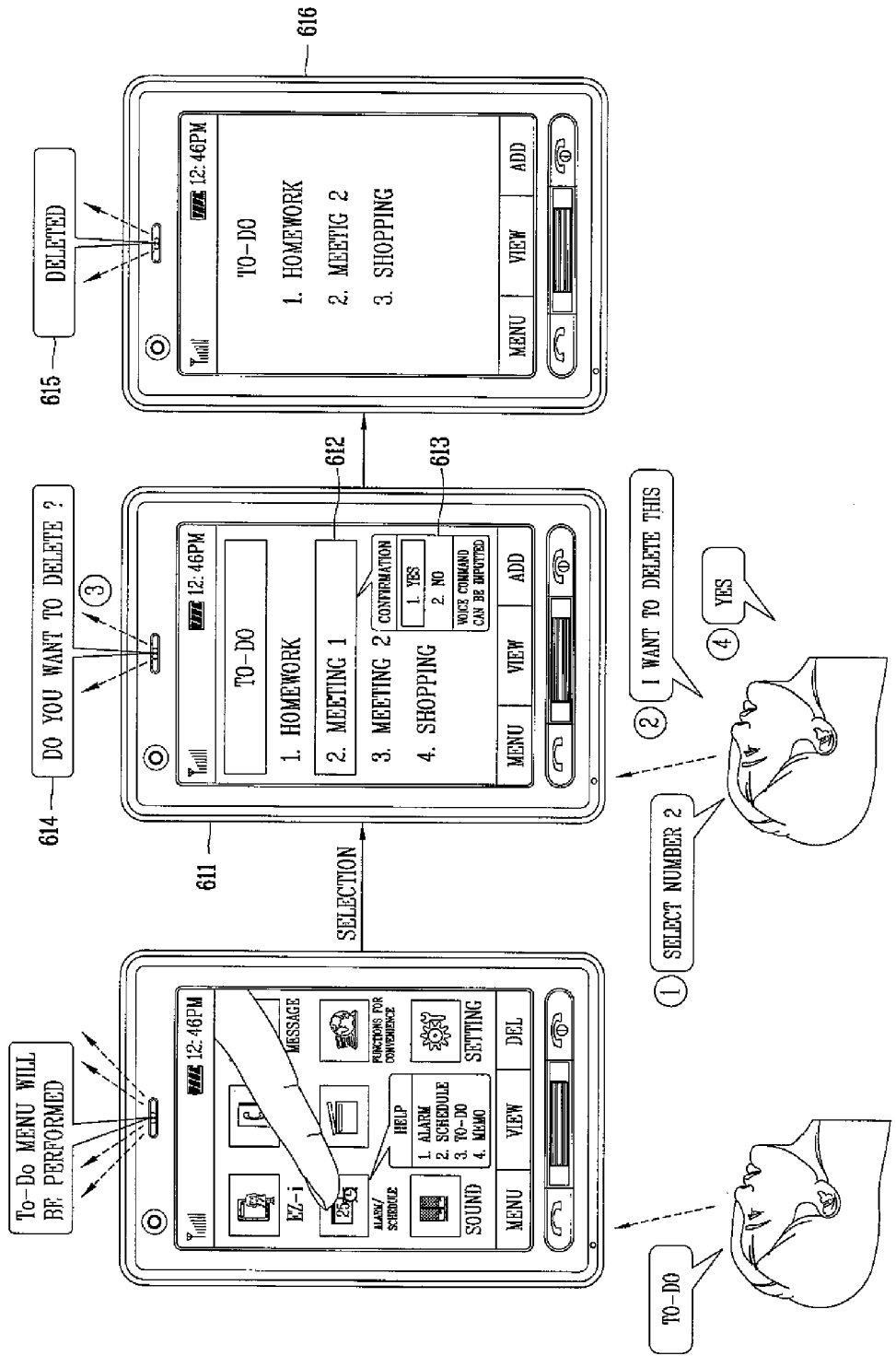
FIG. 12 is an overview showing a method for processing sub-commands relating to a specific menu through a voice command in a mobile terminal according to an embodiment of the present invention.

FIG. 12 is an overview showing a method for processing sub-commands relating to a specific menu of a mobile terminal through a voice command according to an embodiment of the present invention. In this embodiment, it is assumed the user has already activated the voice recognition function.

Then, as shown in the left side of FIG. 12, the user touches the Alarm/Schedule icon, and the controller 180 displays a pop-up help menu listing available functions (e.g., 1) Alarm, 2) Schedule, 3) To do and 4) Memo). Then, the user enters the voice command "To do," and the controller 180 interprets the meaning of the voice command and displays a plurality of menus that are determined to correspond to the voice command as shown in the display screen 611.

That is, as shown in the display screen 611, the controller 180 displays four events related to the To do function. The user then enters the voice command "Select number 2," and the controller 180 selects the number 2 option (Meeting 1). The user then enters the voice command "I want to delete this". The controller 180 then displays a pop-up menu 613 asking the user to confirm yes or no about deleting the entry. The user then enters the voice command "yes" and the controller 180 then deletes the entry as shown in the display screen 616 of FIG. 12.

In addition, if there is no response from the user, the controller 180 may automatically execute the sub-commands by judging the response as a positive answer. The controller 180 also outputs a voice command 615 informing the user that the item was deleted. Also, rather than selecting the first menu Alarm/Schedule by touching the menu, the user could have instead issued another voice command. Also, the controller 180 can issue a voice message 617 when the user first selects the Alarm/Schedule icon to inform the user the corresponding task will be executed.

Further, as discussed above, when the specific menu is executed, the controller 180 specifies a domain of a database used as a reference for voice command recognition into a domain relating to the executed menus. That is, the domain includes information relating to sub-menus of the specific menu, or information relating to sub-commands that can be executed from the specific menu.

Figure 13:
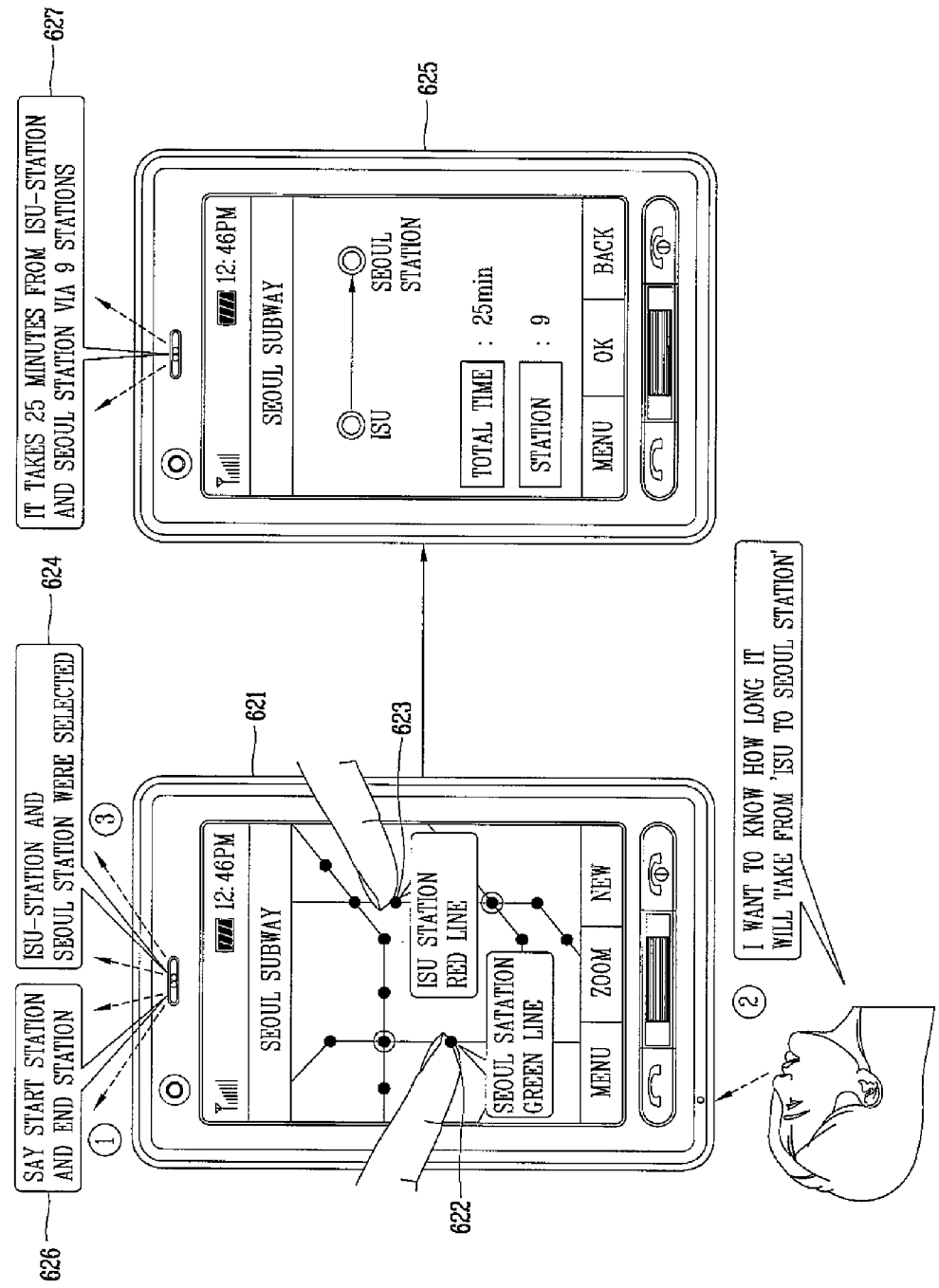
FIG. 13 is an overview showing a method for searching a subway map through a voice command in a mobile terminal according to an embodiment of the present invention.

Next. FIG. 13 is an overview showing a method for searching a subway map through a voice command in a mobile terminal according to an embodiment of the present invention. Again, in this example, it is assumed the user has already activated the voice recognition function. Further, it is also assumed that the controller 180 performs the specific menu related to displaying a Subway map based on the user's voice command or manipulation using other input units.

That is, the controller 180 displays the subway map as shown in the display screen 621. As discussed above, when the specific menu is executed, the controller 180 may specify a domain of database that is used as a reference for voice command recognition into a domain relating to the executed menus (e.g., names for subway stations, distance (time) information between each station). Further, the domain includes information relating to the sub-menus of the specific menu, or information relating to sub-commands that can be executed from the specific menu.

The controller 180 then issues a voice command 626 asking the user to enter start and end stations. The user then selects two stations on the display screen 621. That is, the controller 180 receive two stations 622 and 623 from the displayed subway map that the user wants to know the amount of time it takes to travel between the two stations. The user may select the two stations using a voice command when prompted by the terminal (i.e., say the start and end stations) or by touching the two stations 622 and 623. Other methods of selecting the two stations are also possible. After the user selects the two stations, the controller 180 outputs a voice message 624 that includes the two stations selected via a speaker (i.e., the ISU and Seoul station were selected). Also, rather than outputting a voice message, the controller 180 can instead display pop-up windows with the requested or input information.

Further, the controller 180 can also output help information when the two stations are selected. For example, as shown in the display screen 621 in FIG. 13, the controller displays a help pop-up balloon window listing the name of the station and the color of the metro line. The user then requests the amount of time it will take to travel between the two selected stations. The user can request this information by inputting the voice instruction "I want to know how long it will take from ISU to Seoul Station".

The controller 180 then detects meaningful words (e.g., how long, take, Isu, Seoul Station) relating to processing the subway map information within the domain so as to analyze a context and content of the voice command. Based on the analyzed information, the controller 180 determines that the voice command has a meaning to request time information between the two subway stations Isu and Seoul Station.

Further, when the controller 180 judges the meaning of the voice instructions, the controller 180 may first request the user's confirmation about whether the judged meaning of the voice command is precise. The controller 180 then displays the two stations on the subway map, along with a distance (or time) between the two stations, the number of stops between the two stations, etc. and outputs a voice message 627 informing the user about the result as shown in the display screen 625 in FIG. 13. Further, as described above, if the user doesn't respond to the confirmation request within a particular time period, the controller 180 may interpret this as a positive response and provide the results of the requested service.

Figure 14:
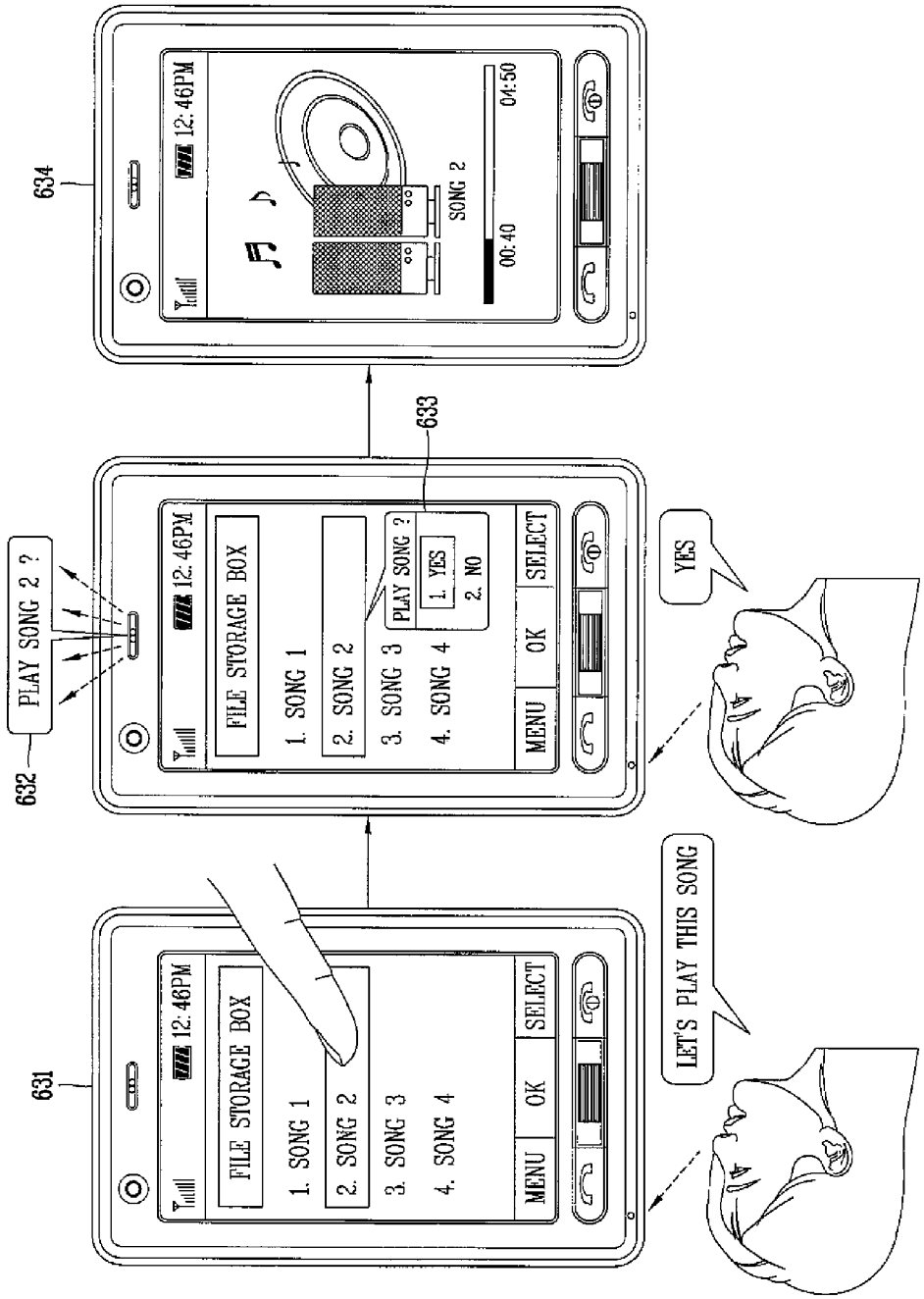
FIG. 14 is an overview showing a method for reproducing multimedia files through a voice command in a mobile terminal according to an embodiment of the present invention.

Next, FIG. 14 is an overview showing a method for reproducing multimedia files through a voice command in a mobile terminal according to an embodiment of the present invention. Further, the following description assumes the user has input the activation control signal, and that the controller 180 starts to activate the voice recognition function. It is also assumed the controller 180 has performed the specific menu related to multimedia reproduction menu by receiving input of a voice command or a user's manipulation using other input units.

That is, as shown in the display screen 631, the controller 180 displays a list of songs that the user can select to be played. Thus, in the present invention, a user's desired multimedia file may be directly searched through a voice command thus to be reproduced. In more detail, once a multimedia reproduction menu is executed, the controller 180 specifies a domain of database used as a reference for voice command recognition into a domain relating to the executed menus.

As discussed above, the domain includes information relating to sub-menus of the multimedia reproduction menu, information relating to sub-commands that can be executed from the multimedia reproduction menu, or information relating to a multimedia file (e.g., file names, reproduction time, copyright owner, etc.).

Further, the controller 180 can display a multimedia file list by receiving input of a voice command or a user's manipulation using other input units. In the example in FIG. 14, the user inputs their natural language voice command (e.g., Let's play this song) under a state that one file is selected from the file list as shown in the display screen 631.

Once the voice command is input, the controller 180 detects meaningful words (e.g., play, this song) relating to the sub-menus or sub-commands for processing the selected menu within the domain. Further, the controller 180 judges a meaning of the voice command by analyzing the detected words and an entire context and content of the voice command.

Once the meaning of the voice command is judged, the controller 180 receive the user's confirmation about whether the judged meaning of the voice command is precise. For example, as shown in FIG. 13, the controller 180 displays a pop-up window 633 asking the user to say "yes" or "No" regarding the playing of the selected song. The controller can also output a voice message 632 asking the user if song 2 is the song to be played. The user can then say "Yes" and the controller 180 outputs the selected song as shown in the display screen 634.

Alternatively, the controller 180 can automatically play the selected song without asking the user to confirm the selection. The user can also use appropriate menu options to set as a default that the controller 180 asks for confirmation about a selected task or does not ask for the confirmation. Further, if there is no response from the user, the controller 180 can automatically execute the judged voice command by judging the response as a positive answer.

Therefore, in this embodiment, a file to be reproduced is selected, and a reproduction command for the selected file is input through a voice command. However, when a user already knows a file name, the file name may be directly input from an upper menu through a voice command.

Figure 15:
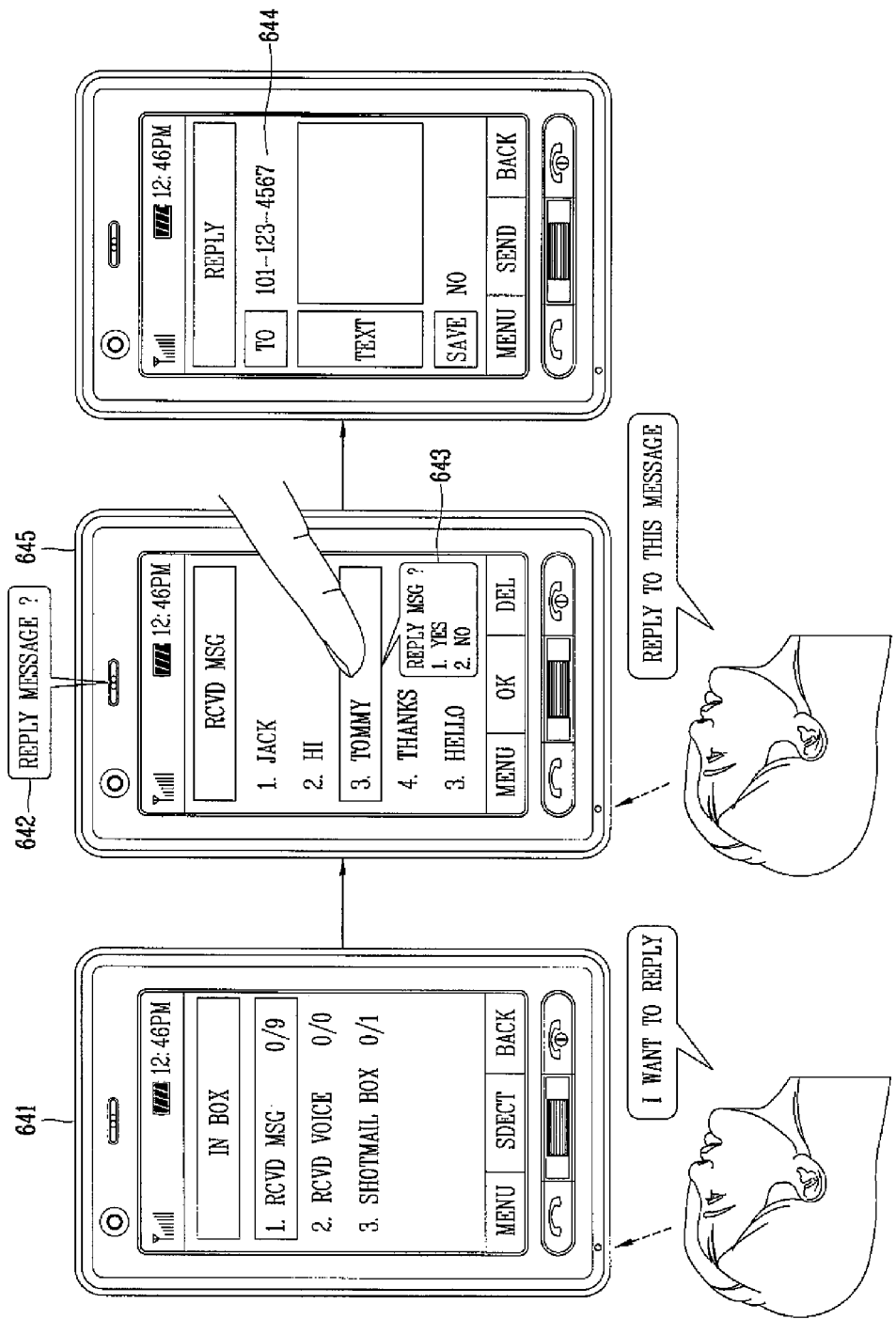
FIG. 15 is an overview showing a method for sending e-mail through a voice command in a mobile terminal according to an embodiment of the present invention.

Next, FIG. 15 is an overview showing a method for sending an email or text message through a voice command in a mobile terminal according to an embodiment of the present invention. Again, this embodiment is described assuming that the activation control signal has already been input, the controller 180 started to activate the voice recognition function, and the controller 180 performed a specific menu (e.g., mail/message send/reception menu) by receiving input of a voice command or a user's manipulation using other input units.

In more detail, once a mail (or message) send/reception menu is executed, the controller 180 specifies a domain of database used as a reference for voice command recognition into a domain relating to the executed menus. The domain includes information relating to sub-menus of the mail/message send/reception menu, information relating to sub-commands that can be executed from the mail/message send/reception menu, information relating to a sent/received mail/messages (e.g., transmitter, receiver, transmitting/receiving time, title, etc.).

The controller 180 also displays a mail/message send/reception list by receiving input of a voice command or a user's manipulation using other input units. As shown in the display screen 641, the user enters the voice instruction "I want to reply." The controller 180 then displays the received messages the user can reply to as shown in the display screen 645. In this example, the user uses his natural language (e.g., Reply to this message) in a state that one mail/message is selected from the mail/message list as shown in the display screen 645.

Further, once the voice command is input, the controller 180 detects meaningful words (e.g., reply, this message) relating to a reply processing for the selected mail/message within the domain. Then, the controller 180 judges a meaning of the voice command (execution of a mail/message reply menu) by analyzing the detected words and an entire context and content of the voice command.

Once the meaning of the voice command is judged, the controller 180 may receive a user's confirmation about whether the judged meaning of the voice command is precise. For example, for the user's confirmation, a voice message 642 may be output, or a text-type message 643 may be output. When the message for a user's confirmation is output, the user can reply through a voice or other input units. If there is no response from the user, the controller 180 can automatically execute functions corresponding to the judged meaning by judging the response as a positive answer. Then, when the mail/message reply menu is executed, the controller 180 automatically inputs the selected calling party's address/phone number in a mail/message writing window 644.

Therefore, in this embodiment, a mail/message to be replied is firstly selected, and a reply command for the selected mail/message is input using a voice command. However, when a user knows information about a calling party, the mail/message reply to the calling party may be directly input through a voice command.

Further, the embodiment shown in FIG. 15 can be modified to correspond to sending text messages. In more detail, the controller 180 includes software to convert the user's voice into text such that the user can tell the terminal what he or she wants to say, and the controller 180 converts the input voice into a text message. The controller 180 can also display to the user the converted text so the user can confirm the conversion is acceptable. The user can then request the terminal send the text message to a desired user.

The modified embodiment is particularly advantageous because entering a text message by hand is a very laborious and tedious process. Many users want to send a text message rather than calling a person for a number of different reasons, but do not want to go through the laborious process of manually selecting multiple keys to send a single text message. The modified embodiment of the present invention allows the user to enter the desired text information using their voice, and then sending the text message to a desired party.

Figure 16:
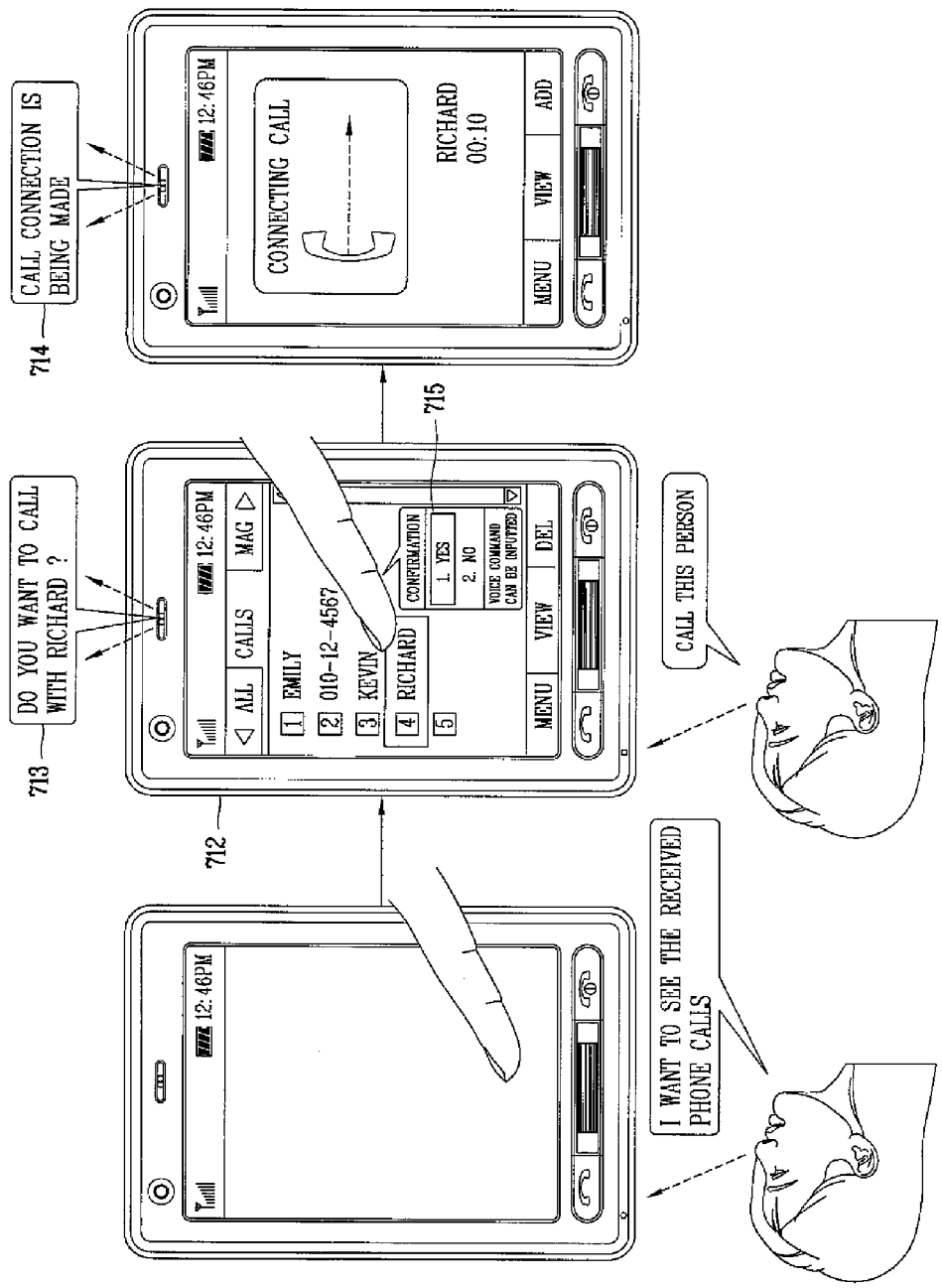
FIG. 16 is an overview showing a method for performing a phone call through a voice command in a mobile terminal according to an embodiment of the present invention.

FIG. 16 is an overview showing a method for performing a phone call through a voice command in a mobile terminal according to an embodiment of the present invention. Similar to the above embodiments, this embodiment also assumes the user has input the activation control signal, the controller 180 has activated the voice recognition function, and the controller 180 has executed a specific menu (e.g., a telephone directory or a menu list about recently received calls) relating to a phone call by receiving input of a voice command or a user's manipulation using other input units.

Once the menu relating to a phone call is executed, the controller 180 specifies a domain of database used as a reference for voice command recognition into a domain relating to the phone call. Further, the domain includes information relating to originating calls, incoming calls, missed calls, etc. and each phone-related information (e.g., originating time, incoming time, transmitter, receiver, calling duration, calling frequency, etc.).

In addition, the controller 180 displays a phone call list by receiving input of a voice command or a user's manipulation using other input units. That is, the user uses his or her natural language to input the voice command (e.g., I want to see the received phone calls) as shown in the display screen 711.

Once the voice command is input, the controller 180 detects meaningful words (e.g., see, received, phone, calls) relating to the phone call within the domain, and judges the voice command to have a meaning, "output received phone calls" by analyzing the detected words and an entire context and content of the voice command. Once the meaning of the voice command is judged, the controller 180 outputs a list for received phone calls as shown in the display screen 712.

Further, the user then inputs the voice command "Call this person" under a state that an item is selected from the outputted list. As a result, the controller 180 judges that the voice command has a meaning, "call to a counter party of a selected received call". Then, the controller 180 receive the user's confirmation about whether the judged meaning of the voice command is precise. That is, the controller 180 can output a voice message 713 or a text-type message 715.

The user can also reply through a voice or other input units. As mentioned above, if there is no response from the user, the controller 180 can automatically execute a function corresponding to the judged meaning by judging the response as a positive answer. The controller 180 also output a message 714 indicating the call connection is being made.

Thus, in this embodiment, a calling party is selected from a phone call list, and a call command to the selected calling party is input through a voice command. However, when a user already knows information about the calling party, a call to the person may be directly executed through a voice command.

Figure 17:
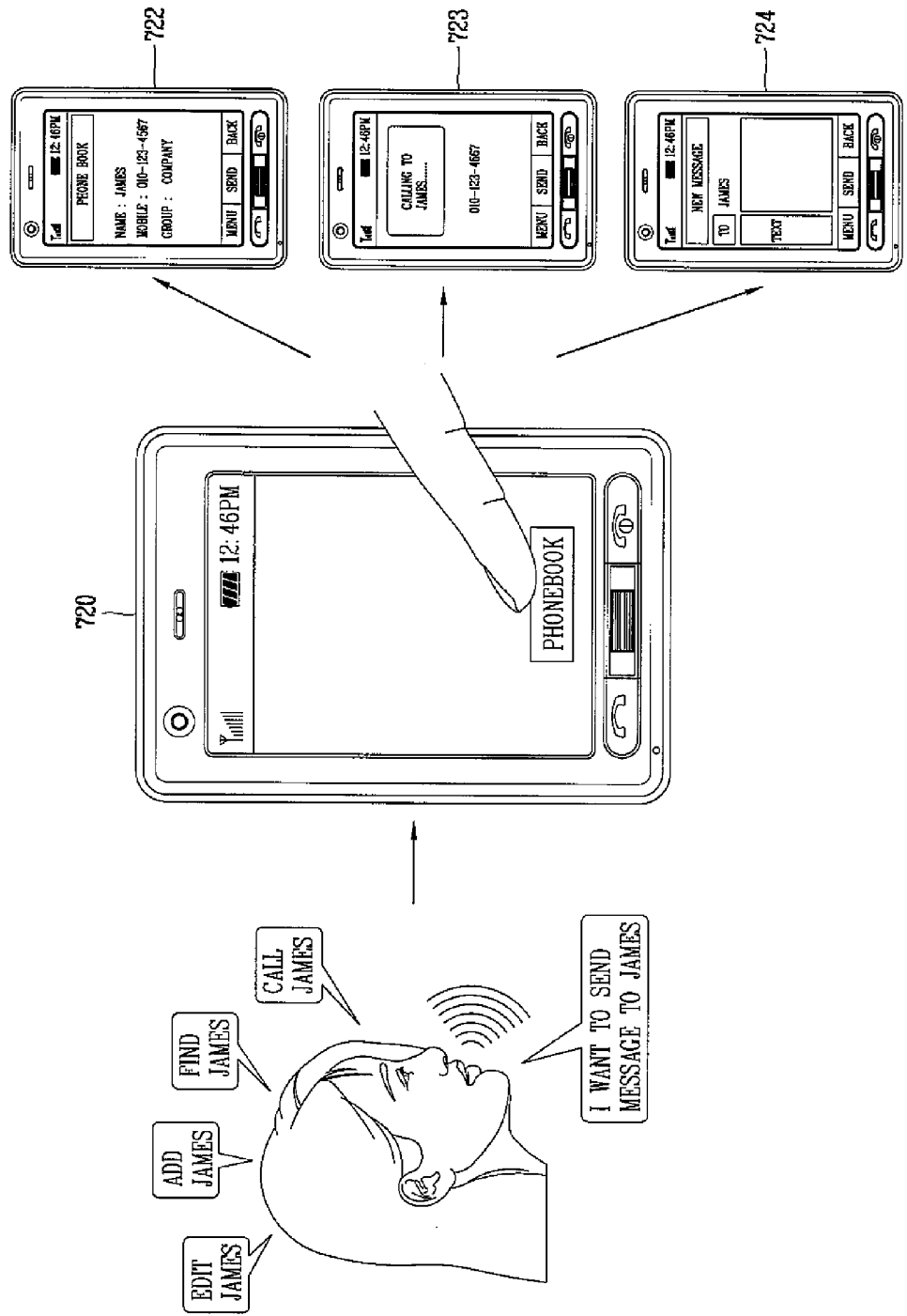
FIG. 17 is an overview showing a method for using phonebook information through a voice command in a mobile terminal according to an embodiment of the present invention.

Next, FIG. 17 is an overview showing a method for using phone-book information through a voice command in a mobile terminal according to an embodiment of the present invention. The same assumptions are made in this description as described above in the other embodiments. That is, it is assumed that once an activation control signal is input, the controller 180 starts to activate the voice recognition function, and the controller 180 selects or performs a specific menu (e.g., a phone book menu) by receiving input of a voice command or a user's manipulation using other input units as shown in the display screen 720.

Once the phone book menu is executed, the controller 180 specifies a domain of database used as a reference for voice command recognition into a domain relating to sub-menus of the phone book menu or sub-commands that can be executed from the phone book menu. Further, the domain is specified so as to enhance a recognition rate, but may not be necessarily specified.

In addition, the user enters a voice command in their natural language (e.g., Edit James, Add James, Find James, Call James, I want to send a Message to James) in a standby state or under a state that menus relating to the phone book are selected. Once the voice command is input, the controller 180 detects meaningful words (e.g., Edit, Add, Find, Call, Send Message, James) relating to the phone call within the domain, and judges each meaning of the voice commands by analyzing the detected words and an entire context and content of the voice commands.

Once each meaning of the voice commands is judged, the controller 180 executes functions or menus corresponding to the respective voice commands as shown in the display screens 722 to 724. Further, before the execution, the controller 180 can receive a user's confirmation about whether the judged meanings of the voice commands are precise. As discussed above, for the user's confirmation, a voice message or a text-type message may be output.

In addition, when the message for a user's confirmation is output, the user may reply through a voice or other input units. If there is no response from the user, the controller 180 can automatically execute functions corresponding to the judged meanings by judging the response as a positive answer.

Figure 18:
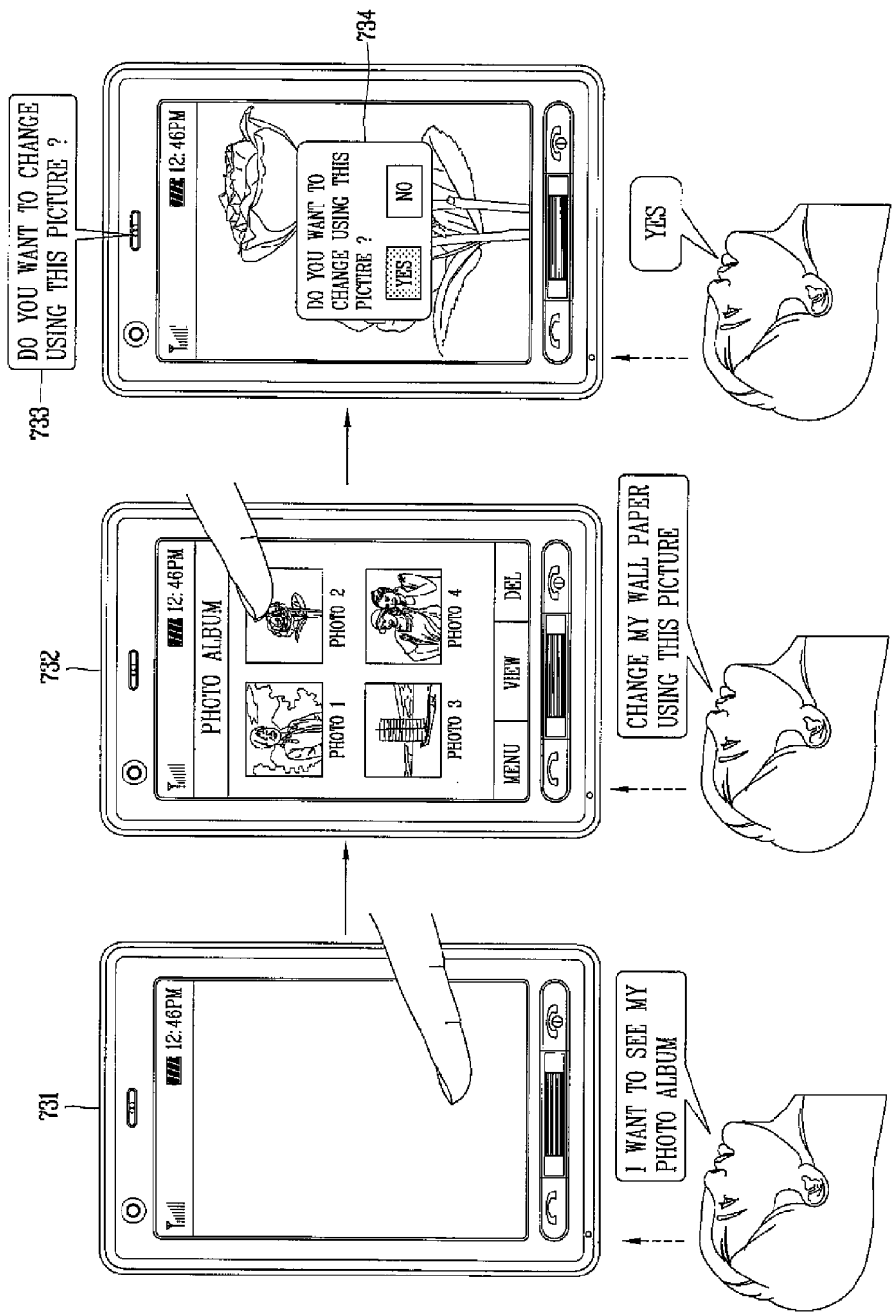
FIG. 18 is an overview showing a method for changing a background screen through a voice command in a mobile terminal according to an embodiment of the present invention.

Next, FIG. 18 is an overview showing a method for changing a background screen through a voice command in a mobile terminal according to an embodiment the present invention. Again, this description assumes that once an activation control signal is input, the controller 180 starts to activate the voice recognition function, and performs a specific menu (e.g., a photo album menu) by receiving input of a voice command or a user's manipulation using other input units.

The photo album menu may be executed by input of a voice command or sub-menus of multi-steps using other input units. Also, the photo album menu may be directly executed by a natural language voice command (e.g., I want to see my photo album) as shown in the display screen 731. According to the judged meaning of the voice command, the controller 180 outputs a photo list by executing a photo album menu as shown in the display screen 732. Then, the controller 180 receive one photo selected from the outputted photo album list.

Under this state, if a user's voice command (e.g., Change my wall paper using this picture) is input, the controller 180 detects meaningful information (e.g., change, wall paper) relating to sub-menus or sub-commands of the executed menu. Then, the controller 180 judges a meaning of the voice command by analyzing the detected words and an entire context and content of the voice command. That is, the controller 180 judges the voice command to have a meaning "Change a background screen into a selected photo".

Once the meaning of the voice command is judged, the controller 180 displays the background screen to correspond with the selected photo, and receives a user's confirmation about whether the judged meaning of the voice command is precise. Here, for the user's confirmation, a voice message 733 may be output, or a text-type message 734 may be output. The judged voice command may also be directly executed without the user's confirmation according to a high recognition rate or a predefined environment setting menu.

When the message for a user's confirmation is output, the user can reply through a voice or other input units. If there is no response from the user, the controller 180 can automatically execute a function corresponding to the judged voice command meaning by judging the response as a positive answer.

In order to change a background screen, the photo album menu may not be necessarily executed at first as shown in the present embodiment. Rather, after a background screen menu is executed, a user's desired photo may be searched to be changed.

Figure 19:
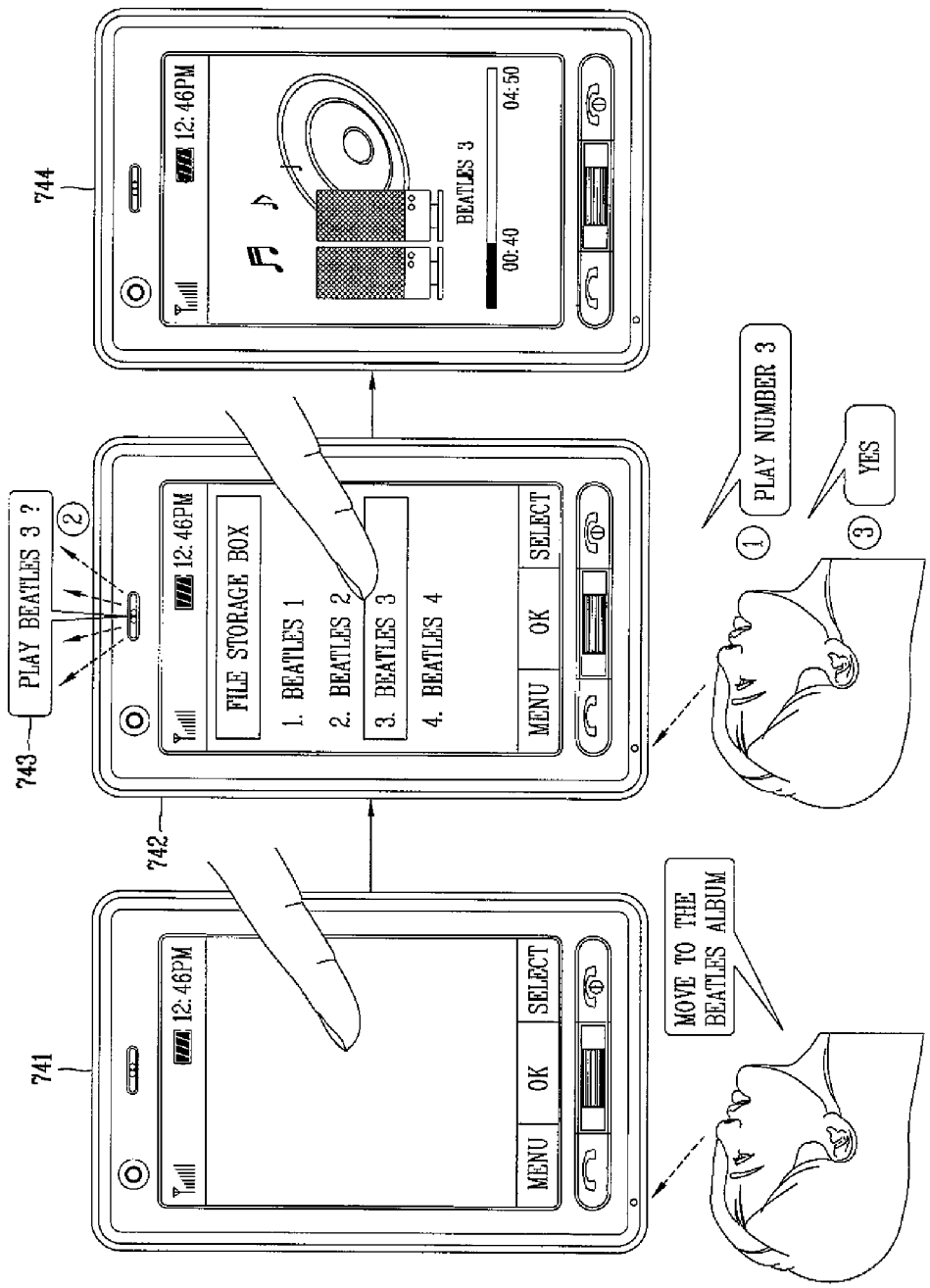
FIG. 19 is an overview showing a method for reproducing multimedia files through a voice command in a mobile terminal according to an embodiment of the present invention.

FIG. 19 is an overview showing a method for reproducing multimedia files through a voice command in a mobile terminal according to an embodiment of the present invention. Similar to the above embodiments, this description assumes that once an activation control signal is input, the controller 180 starts to activate the voice recognition function, and performs a specific menu (e.g., a multimedia reproduction menu) by receiving input of a voice command or a user's manipulation using other input units.

In order to reproduce a multimedia file by a user, the specific menu is executed, one of sub-menus of the specific menu is selected to display a file list, and one file is selected from the file list thus to be reproduced. However, in the present invention, a user's desired multimedia file may be directly searched through a voice command thus to be reproduced.

For example, if a specific voice command (e.g., Move to the Beatles album) is input after the voice recognition function is activated, the controller 180 judges a meaning of the voice command by analyzing an entire context and content of the voice command as shown in the display screen 741. Based on the analyzed information, the controller 180 executes specific functions or menus, or displays a file list by moving to a specific file folder as shown in the display screen 742.

When the voice command (e.g., Play this song or Play number 3) is input after one file is selected from the file list, the controller 180 judges a meaning of the voice command by analyzing an entire context and content of the voice command. In addition, functions or menus corresponding to the meaning of the voice command may be directly executed according to a high recognition rate or a predefined environment setting menu.

Once the meaning of the voice command is judged, the controller 180 receives a user's confirmation about whether the judged meaning of the voice command is precise. Here, for the user's confirmation, a text-type message or a voice message 743 may be output. When the message for a user's confirmation is output, the user can reply through a voice or other input units. If there is no response from the user, the controller 180 can automatically execute a function of the judged voice command by judging the response as a positive answer. The controller 18 then executes or plays the selected song as shown in the display screen 744.

Thus, in this embodiment, a file to be reproduced is selected, and a reproduction command for the selected file is input through a voice command. However, when a user knows a file name, the file name can be directly input from an upper menu through a voice thus to be reproduced.

Therefore, according to embodiments of the present invention, an input voice command is converted to a specific form in a state that a voice recognition function is activated, and a context and content thereof are compared with the database specified into a domain used as a reference. Further, a result value corresponding to a judged meaning of the voice command is output to a specific component of the mobile terminal The mobile terminal of the present invention can control menus relating to specific functions or services thereof by judging a meaning of an input voice command based on a context and content. Further, the mobile terminal of the present invention can enhance a voice recognition rate by specifying a domain for voice recognition into a domain relating to specific menus or services according to an operation state or an operation mode thereof.

Also, the mobile terminal of the present invention can simultaneously select or execute menus relating to specific functions or services, by applying one or more user's interfaces (UI) thereof even while a voice recognition function is activated, so as to detect a user's manipulation. In addition, the mobile terminal of the present invention can control menus relating to specific functions or services through a voice command regardless of a user's skill, by providing help information with respect to input of the voice command according to an operation state or an operation mode thereof.

Further, the multiple domains can include at least two domains from an email domain corresponding to emails sent and received on the mobile terminal, a scheduling task domain corresponding to scheduling events assigned on the mobile terminal, a contact domain corresponding to contacts on the mobile terminal, a phonebook domain corresponding to phone numbers stored on the mobile terminal, a map domain corresponding to map information provided by the mobile terminal, a photo domain corresponding to photos stored on the mobile terminal, a message domain corresponding to messages sent and received on the mobile terminal, a multimedia domain corresponding to multimedia functions performed on the mobile terminal, an external device domain corresponding to external devices the mobile terminal can connect to, a call history domain corresponding to calls sent and received on the mobile terminal, and a settings domain corresponding to setting functions performed on the mobile terminal.

Moreover, the predetermined threshold of the recognition rate can be set by a manufacturer of the mobile terminal or by a user of the mobile terminal.

In addition, the above various embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a mobile terminal having a display, the method comprising:
   activating a mode for detecting voice input in response to a touch input to a soft button displayed on the display or to a hard button on the mobile terminal, wherein the mode for detecting the voice input is deactivated if there is no voice input detected for a predetermined amount of time;
   receiving a voice input associated with a calling operation of the mobile terminal;
   displaying an indicator indicating the voice input is being recognized by the mobile terminal, wherein the indicator comprises a waveform shape;
   executing the calling operation only if there is a single contact in a phonebook that matches a meaning of the received voice input;
   if there is no single contact that matches the meaning of the received voice input, performing a learning process using keywords of the voice input for learning the meaning of the received voice input;
   outputting a voice prompt based on the learned meaning of the received voice input prompting if the learned meaning of the received voice input should be saved in the phonebook as the single contact that matches the meaning of the received voice input; and
   storing the single contact in the phonebook based on an affirmative received response to the voice prompt.

2. The method of claim 1, wherein the voice input is in a natural language.

3. The method of claim 1, wherein the mode for detecting the voice input is triggered in response to a short-range wireless signal or a long-range wireless signal.

4. The method of claim 1, further comprising:
   receiving a user selection, in response to the voice prompt, via a first additional voice input or by a touching operation; and
   receiving a second additional voice input from the user or displaying a list of options when the first additional voice input is disaffirmed by the user selection.

5. The method of claim 4, wherein a recognition rate for the voice input is updated based on the user selection with the recognition rate increasing if the user selection affirms the voice input.

6. The method of claim 5, wherein a pattern of using the mobile terminal is used to improve the recognition rate.

7. The method of claim 1, wherein the displaying the indicator comprises:
   generating help information in a voice message or a text, the help information prompting a user to clarify the voice input if the voice input is not clear to the mobile terminal.

8. The method of claim 1, wherein the indicator further comprises text converted from the voice input.

9. The method of claim 1, further comprising:
   determining a meaning of the voice input;
   outputting a result value of the determined meaning, wherein the result value comprises a menu relating to a function or service corresponding to the determined meaning;
   requesting a user of the mobile terminal to confirm whether the result value is accurate by selecting the menu; and
   executing the menu when selected by the user.

10. A mobile terminal, comprising:
    a wireless communication unit configured to provide wireless communication;
    a display; and
    a controller configured to:
    activate a mode for detecting voice input in response to a touch input to a soft button displayed on the display or to a hard button on the mobile terminal, wherein the mode for detecting the voice input is deactivated if there is no voice input detected for a predetermined amount of time,
    receive a voice input associated with a calling operation of the mobile terminal,
    display an indicator on the display indicating the voice input is being recognized by the mobile terminal, wherein the indicator comprises a waveform shape,
    execute the calling operation only if there is a single contact in a phonebook that matches a meaning of the received voice input,
    if there is no single contact that matches the meaning of the received voice input, perform a learning process using keywords of the voice input for learning the meaning of the received voice input,
    output a voice prompt based on the learned meaning of the received voice input prompting if the learned meaning of the received voice input should be saved in the phonebook as the single contact that matches the meaning of the received voice input, and
    store the single contact in the phonebook based on an affirmative received response to the voice prompt.

11. The mobile terminal of claim 10, wherein the mode for detecting the voice input is triggered in response to a short-range wireless signal or a long-range wireless signal.

12. The mobile terminal of claim 10, wherein the controller is further configured to:
    receive a user selection, in response to the voice prompt, via a first additional voice input or by a touching operation, and
    receive a second additional voice input from the user or displaying a list of options when the first additional voice input is disaffirmed by the user selection.

13. The mobile terminal of claim 12, wherein a recognition rate for the voice input is updated based on the user selection with the recognition rate increasing if the user selection affirms the voice input.

14. The mobile terminal of claim 13, wherein a pattern of using the mobile terminal is used to improve the recognition rate.

15. The mobile terminal of claim 10, wherein the controller is further configured to:
generate help information in a voice message or a text, the help information prompting a user to clarify the voice input if the voice input is not clear to the mobile terminal.

16. The mobile terminal of claim 10, wherein the indicator further comprises text converted from the voice input.

17. The mobile terminal of claim 10, wherein the controller is further configured to:
determine a meaning of the voice input,
output a result value of the determined meaning, wherein the result value comprises a menu relating to a function or service corresponding to the determined meaning,
request a user of the mobile terminal to confirm whether the result value is accurate by selecting the menu, and
execute the menu when selected by the user.

18. The mobile terminal of claim 10, wherein the controller is further configured to activate or terminate the mode for detecting the voice input in response to a touch input, a double touch input, or a long touch input to the soft button.

19. The mobile terminal of claim 10, wherein the controller is further configured to activate the mode for detecting the voice input in response to a touch input, a double touch input, or a long touch input to the hard button.

20. The mobile terminal of claim 10, wherein the controller is further configured to activate the mode for detecting the voice input in response to at least one of a specific sound, a specific sound effect, a wireless signal, a hand gesture, or a body gesture.

* * * * *